US010154566B1

(12) United States Patent
Lu et al.

(10) Patent No.: US 10,154,566 B1
(45) Date of Patent: Dec. 11, 2018

(54) OCCUPANCY AND NON-OCCUPANCY DETECTION IN THE LIGHTING SYSTEM

(71) Applicant: ABL IP HOLDING LLC, Conyers, GA (US)

(72) Inventors: Min-Hao Michael Lu, Castro Valley, CA (US); Michael Miu, Castro Valley, CA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 15/950,670

(22) Filed: Apr. 11, 2018

Related U.S. Application Data

(63) Continuation of application No. 15/720,254, filed on Sep. 29, 2017, now Pat. No. 9,986,623.

(51) Int. Cl.
*H05B 37/00* (2006.01)
*H05B 37/02* (2006.01)
*H04B 17/318* (2015.01)
*H05B 33/08* (2006.01)

(52) U.S. Cl.
CPC ....... *H05B 37/0227* (2013.01); *H04B 17/318* (2015.01); *H05B 33/0845* (2013.01); *H05B 37/0272* (2013.01)

(58) Field of Classification Search
CPC ... H04B 3/52; H04B 3/56; H04B 3/54; H04B 3/36; H04B 17/318; H04B 2203/5483; H04B 3/02; H04B 3/03; H04B 3/58; H04B 5/0018; H04B 7/04; H04B 10/116; H04B 2001/0408; H04B 3/50; H04B 3/544

See application file for complete search history.

(56) References Cited

U.S. PATENT DOCUMENTS

| | | |
|---|---|---|
| 9,474,042 B1 | 10/2016 | Wootton et al. |
| 2012/0143357 A1 | 6/2012 | Chemel et al. |
| 2014/0119160 A1 | 5/2014 | Shilling et al. |
| 2016/0294492 A1 | 10/2016 | Mostofi et al. |
| 2017/0228874 A1 | 8/2017 | Roberts |

OTHER PUBLICATIONS

Nordic Semiconductor: nRF51822—Multi-protocol Bluetooth Low Energy and 2.4GHz proprietary system-on-a chip, document printed Aug. 10, 2017 (2 pages).
Entire Prosecution History of U.S. Appl. No. 15/720,254, filed Sep. 29, 2017, entitled "Occupancy and Non-Occupancy Detection in the Lighting System".
International Search Report and Written Opinion for International Application No. PCT/US2018/033140, dated Aug. 8, 2018, 10 pages.

*Primary Examiner* — Monica C King
(74) *Attorney, Agent, or Firm* — RatnerPrestia

(57) ABSTRACT

Disclosed herein is a lighting system including a detector, which is configure to obtain an indicator data of a RF signal. The detector compares the indicator data with a baseline indicator data to generate a difference value and determines a rate of change from the indicator data. The detector also determines a data metric based on the rate of change and the difference value and compares the data metric with a transition threshold to detect one of an occupancy condition or a non-occupancy condition in the area. The lighting system also includes a light source, which is controlled in response to the detected one of the occupancy condition or the non-occupancy condition in the area.

46 Claims, 14 Drawing Sheets

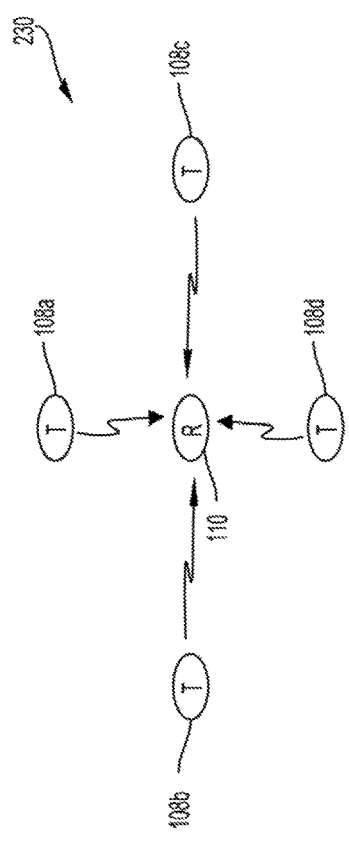
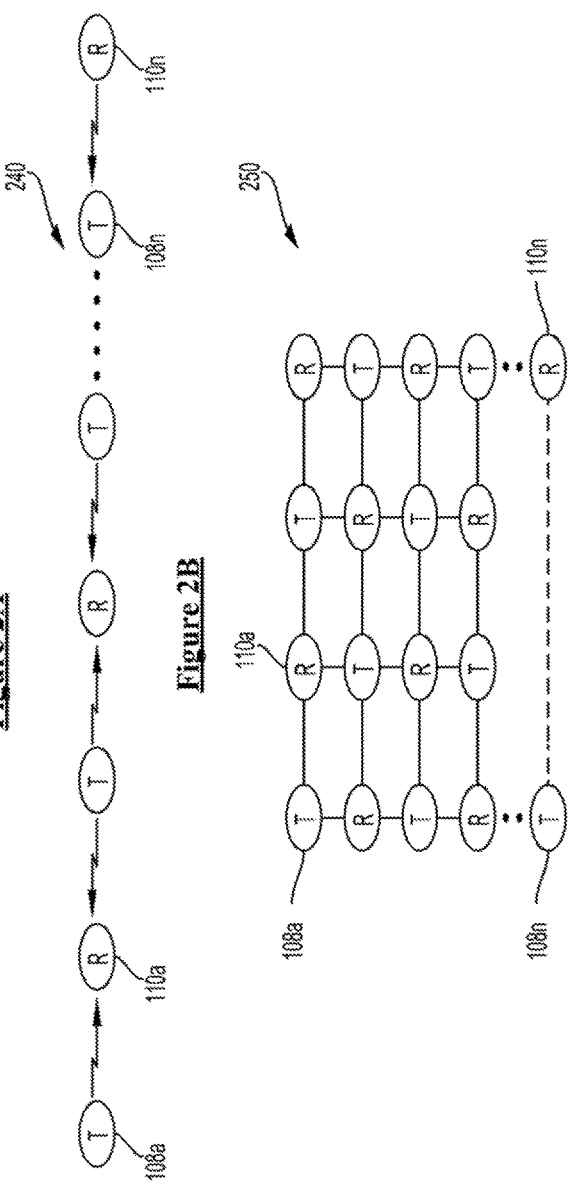
Figure 2A
Figure 2B
Figure 2C

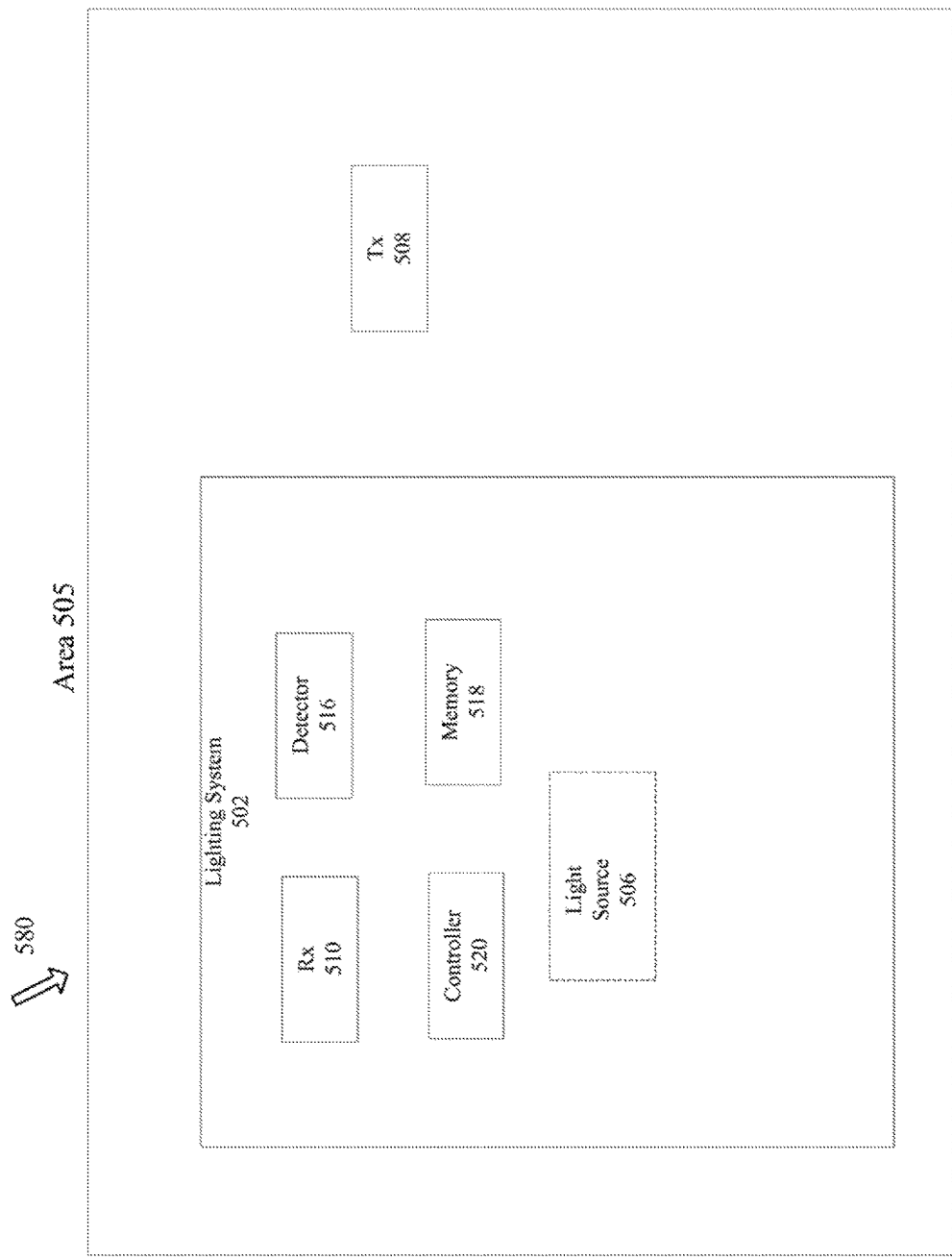

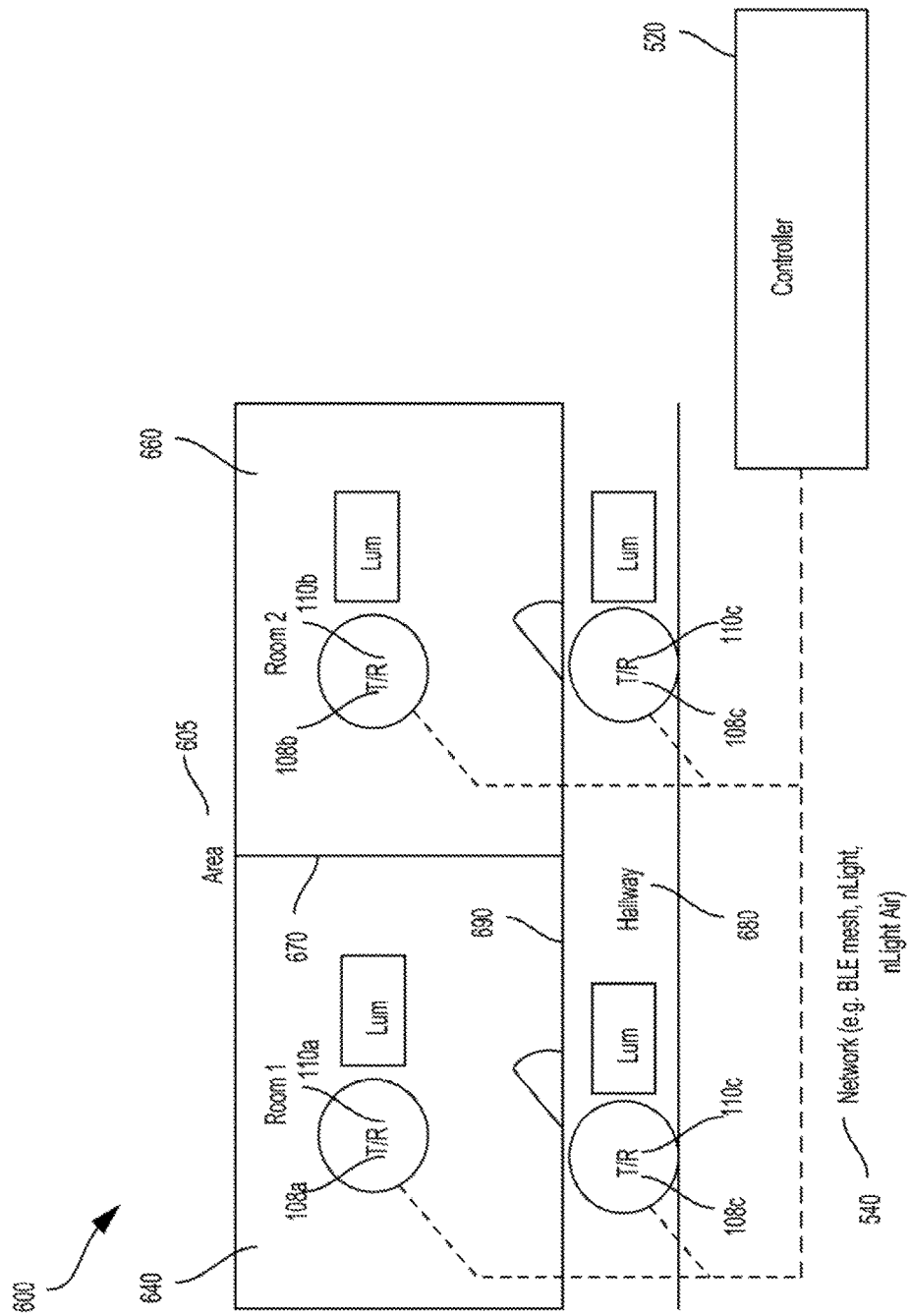

OCCUPANCY AND NON-OCCUPANCY DETECTION IN THE LIGHTING SYSTEM

CROSS-REFERENCE TO RELATED APPLICATIONS

This application is a Continuation of U.S. patent application Ser. No. 15/720,254 filed Sep. 29, 2017, entitled "OCCUPANCY AND NON-OCCUPANCY DETECTION IN THE LIGHTING SYSTEM", which is hereby incorporated herein by reference in its entirety.

BACKGROUND

In recent years, a number of systems and methods have been proposed for occupancy detection within a particular area utilizing radio frequency (RF) based technologies. Examples of such systems include video sensor monitoring systems, radio frequency identification (RFID) systems, global positioning systems (GPS), and wireless communication systems among others. However, many of these systems have several disadvantages. For example, the video sensor monitoring system require a considerable amount of dedicated sensors that are expensive and require a large amount of memory for storing data. The RFID systems rely on occupants carrying an RFID tag/card that can be sensed by the RFID system to monitor the occupants. The GPS system uses orbiting satellites to communicate with the terrestrial transceiver to determine a location of the occupant in the area. However, such systems are generally less effective indoors or in other environments where satellite signals may be blocked, reducing accuracy of detecting the occupant in the area.

Electrically powered artificial lighting has become ubiquitous in modern society. Since the advent of electronic light emitters, such as lighting emitting diodes (LEDs), for general lighting type illumination application, lighting equipment has become increasingly intelligent with incorporation of sensors, programmed controller and network communication capabilities. Automated control, particularly for enterprise installations, may respond to a variety of sensed conditions, such a daylight or ambient light level and occupancy. Commercial grade lighting systems today utilize special purpose sensors and related communications.

There also have been proposals to detect or count the number of occupants in an area based on effects of an RF signal received from a transmitter due to the presence of the occupant(s) in the area. These RF wireless communication systems generally detect an occupant in the region based on change in signal characteristics of a data packet transmitted over the wireless network.

BRIEF DESCRIPTION OF THE DRAWINGS

The drawing figures depict one or more implementations in accordance with the present teachings, by way of example only, not by way of limitation. In the figures, like reference numerals refer to the same or similar elements.

FIG. 2A illustrates an example of a multiple transmitter and a single receiver wireless topology in a lighting system.

FIG. 2B illustrates an example of a linear wireless topology of multiple transmitters and multiple receivers in a lighting system.

FIG. 2C illustrates an example of a grid wireless topology of multiple transmitters and multiple receivers in a lighting system.

FIG. 5C illustrates a functional block diagram of another example of an occupancy sensing system in accordance with another implementation of a lighting system.

FIG. 6 illustrates an example of a wireless topology of a lighting system with multiple transmitter and receiver group pairs in a machine learning (ML) implementation.

DETAILED DESCRIPTION

Figure 1:
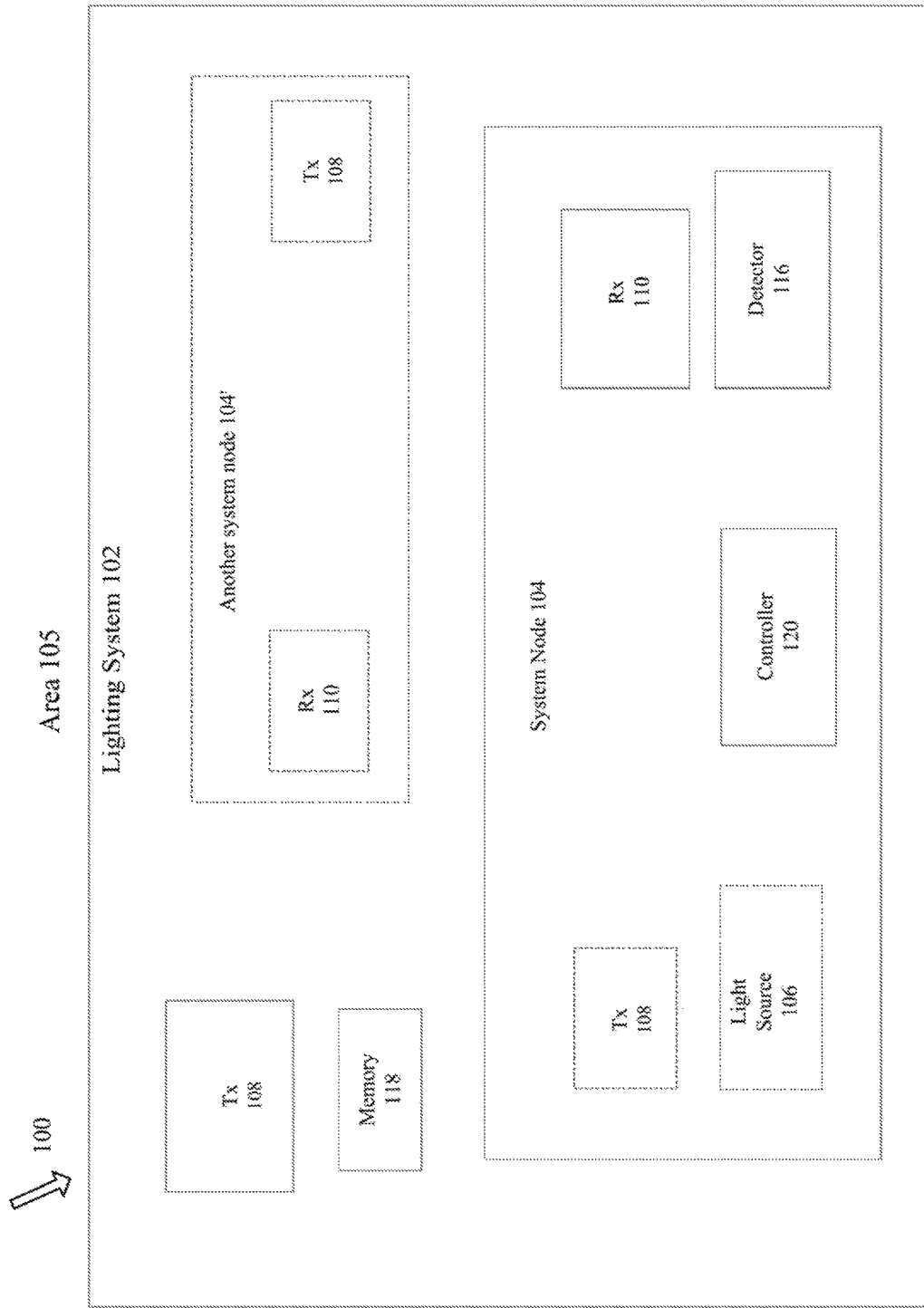
FIG. 1 illustrates a functional block diagram of an example of an occupancy sensing system in accordance with an implementation of a local control of a light source in a lighting system.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Although there have been suggestions to control lighting based on RF wireless detection results, the RF-based detection systems have not themselves been integrated as part of a lighting system of which the lighting operation are controlled as a function of the detection.

There is also room for improvement in the RF wireless detection algorithms for lighting system control. For example, an improved algorithm may enable a more rapid and real time response so that an occupant entering a previously empty area perceives that system instantly turns ON the light(s) in the area. As another example, an improved algorithm may offer improved detection accuracy, e.g. to reduce false positives in detecting an occupant.

The examples described below and shown in the drawings integrate RF wireless based occupancy/non-occupancy detection capabilities in one or more lighting devices or into lighting devices and/or other elements of a lighting system. Examples of a detection system address some or all of the concerns noted above regarding rapid real time detection of changes in occupancy/non-occupancy status and/or improved detection performance, such as reduction of false positive occupancy detections. These advantages and possibly other advantages may be more readily apparent from the detailed description below and illustration of aspects of the examples in the drawings.

Referring to FIG. 1, there is shown a functional block diagram of an example of an occupancy sensing system 100 configured to function on a radio frequency (RF) wireless communication network in accordance with an implementation of a local control of a light source in a lighting system. As illustrated, the occupancy sensing system 100 includes a lighting system (system) 102 disposed within a physical space/area 105 such as a room, corridor, hallway, or doorway. In one implementation, indoor environment is described, but it should be readily apparent that the systems and methods described herein are operable in external environments as well.

The system 102 includes at least one intelligent system node (system node) 104. The system node has an intelligence capability to transmit and receive data and process the data. In one example, the system node includes a light source and is configured as a lighting device. In another example, the system node includes a user interface component and is configured as a lighting controller. In another example the system node includes a switchable power connector and is configured as a plug load controller. In a further example, the system node includes sensor detector and is configured as a lighting related sensor.

In one implementation, the system node 104 includes a wireless radio receiver (Rx) 110 configured to receive the RF signals, including signals from the Tx 108. As shown in FIG. 1, in an alternate implementation, the Tx 108 is located inside the system node 104 104 (e.g. at opposite ends of the system node 104). In another alternate implementation, as shown in FIG. 1, the system 102 includes another system node 104' including another Tx 108' and another Rx 110' (e.g. at opposite ends of the system node 104'). In another alternate implementation, the system node 104 includes a light source 106 and is configured as lighting device. The lighting device, for example, may take the form of a lamp, light fixture, or other luminaire that incorporates the light source, where the light source by itself contains no intelligence or communication capability, such as one or more LEDs or the like, or a lamp (e.g. "regular light bulbs") of any suitable type. The light source 106 is configured to illuminate the area 105. In one example, the light source 106 is configured to illuminate portions or regions of the area 105. Typically, a lighting system will include one or more other system nodes, such as a wall switch, a plug load controller, or a sensor.

In one implementation, the system node 102 includes occupancy/non-occupancy detector (detector) 116. In one implementation, the detector detector 116 is within firmware of a processor configured to determine one of an occupancy condition or a non-occupancy condition in the area 105, although other processor implementations may be used. In one implementation, the system node 104 includes a controller 120 coupled to the detector 116. In one implementation the controller 120 may be the same or an additional processor configured to control operations of elements in the system node 104 in response to determination of one of the occupancy condition or the non-occupancy condition in the area 105. For example, in an alternate implementation, when the system node 104 is configured to be a lighting device and includes a light source 106, the controller 120 controller is configured to process a signal to control operation of the light source 106. In one alternate implementation, the controller 120 is configured to turn ON the light source 106 upon an occupancy condition detected by the detector 116. In one implementation, the controller 120 is configured to turn OFF the light source 106 upon a non-occupancy condition detected by the detector 116. In another implementation, the controller 120 communicates the occupancy condition or non-occupancy condition to the lighting network=via a data packet. The data packet is received by one or more luminaries in the lighting network, which are configured to turn ON or OFF the light source 106 based on the occupancy or the non-occupancy condition respectively provided in the data packet. Accordingly, the occupancy sensing system 100 communicates the occupancy/non-occupancy condition with other networks.

In examples discussed in more detail later, system nodes often include both a transmitter and a receiver (sometimes referenced together as a transceiver), for various purposes. At times, such a node may use its transmitter as part of an occupancy sensing operation; and at other times such a node may use its receiver as part of an occupancy sensing operation. Such nodes also typically include a processor, memory and programming (executable instructions in the form of software and/or firmware). Although the processor may be a separate circuitry (e.g. a microprocessor), in many cases, it is feasible to utilize the central processing unit (CPU) and associated memory of a micro-control unit (MCU) integrated together with a transceiver in the form of a system on a chip (SOC). Such an SOC can implement the wireless communication functions as well as the intelligence (e.g. including any detector or controller capabilities) of the system node.

Although the system 102 of FIG. 1 illustrates an implementation of a single Tx 108, the system 102 may include other implementations such as multiple Tx 108a-108n (see e.g. FIGS. 2A to 2C). Also, FIG. 1 illustrates the implementation of a single Rx 110, but the system 102 may include other implementations such as multiple Rx 110a-110n (see e.g. FIGS. 2B to 2C). Further, the implementation of the system 102 shown includes a single lighting device 104, however, the system 102 may include multiple lighting devices 104a-104n (see e.g. FIG. 7) including one or more Tx 108 and one or more Rx 110.

For discussion of an initial example of operation, assume that the system 102 includes just the elements shown in FIG. 1. In one example, the system node 102 includes the capabilities to communicate over two different RF bands, although the concepts discussed herein are applicable to devices that communicate with luminaries and other system elements via a single RF band. Hence, in the dual band example, the Tx 108/Rx 110 may be configured for sending and receiving various types of data signals over one band, and/or for pairing and commissioning messages over another band. For example, the Tx 108 and Rx 110 are configured as a 900 MHz transmitter and receiver for communication of a variety of system or user data, including lighting control data, for example, commands to turn lights on/off, dim up/down, set scene (e.g., a predetermined light setting), and sensor trip events. Alternatively, the Tx 108/Rx 110 may be configured as a 2.4 GHz transmitter and receiver for Bluetooth low energy (BLE) communication of various messages related to commissioning and maintenance of a wireless lighting system.

In one implementation, benefits of the system include the ability to take advantage of Tx 108 and the Rx 110 (e.g. RF Tx and RF Rx) already installed in a location in the area 105, and because the system passively monitors signal broadcasts in the area 105 at a plurality of times, the wireless occupancy detection functionality does not require (does not rely on) the occupants to carry any device.

At a high level, the wireless communication transmitter Tx 108 transmits a RF for the plurality of times. The transmission may be specifically for the occupancy detection. In some cases, however, where the transmitter is in another lighting device or other lighting system element (e.g. a sensor or a wall switch), the transmissions are regular lighting related communications, such as report status, sending commands, reported sensed events, etc. The wireless communication receiver Rx 110 receives the transmissions of the RF signal through the area 105 for each of the plurality of times. Rx 110 generates an indicator data of plurality of characteristics of the RF signal at the plurality of times. Some of the characteristics include but are not limited to received signal strength indicator (RSSI) data, bit error rate, packet error rate, phase change etc. or a combination of two or more thereof. The RSSI data represents measurements of signal strength of the received RF. The bit error rate is rate of incorrect bits in received RF signals versus total number of bits in the transmitted RF signals. The packet error rate is rate of incorrect packets in received RF signals versus total number of packets the transmitted RF signals. Phase change is a change of phase of a received RF signal compared to previous reception of the RF signal (typically measured between the antennas spaced apart from each other). For the purpose of the present description, we use RSSI data as the characteristics of the RF signal for processing by the Rx 110 to generate as the indicator data. Rx 110 measures the signal strength of the RF signal and generates the RSSI data based on the signal strength. The signal strength of each of the RF signal is based whether an occupant exists in a path between the Tx 108 and Rx 110 in the area 105. In one implementation the detector obtains the generated RSSI data at each of the plurality of times and determines one of an occupancy condition or a non-occupancy condition in the area 105 as described in greater detail herein below.

In one implementation, when each time among the plurality of times is a current time, the detector 116 compares RSSI data generated at the current time with the RSSI data generated at a preceding time among the plurality of times to determine a rate of change. In one implementation, the preceding time is a time interval and the RSSI data generated at the preceding time is an average RSSI data determined over the time interval. The preceding time interval occurs before the current time. In one example, the preceding time interval occurs immediately before the current time. In one implementation, the RSSI data generated at the current time is compared with the average RSSI data based on one or more parameters. In one example, the parameter is a frequency and a difference value (change) is determined in frequency between the generated RSSI data at the current time and the average RSSI data at the preceding time. In another example, the parameter is a magnitude and a difference value (change) is determined in magnitude between the generated RSSI data at the current time and the average RSSI data at the preceding time.

In one implementation, the lighting system 102 includes a memory 118 that stores baseline indicator data at an earlier time. In one implementation, the baseline indicator data defines a non-occupancy condition in the area at the earlier time. In one implementation, the detector compares the RSSI data generated at the current time with the baseline indicator data to generate a difference value. In one implementation, the baseline indicator data is calculated from RSSI data values at the earlier time, which is much longer time back before the current time. In one implementation the baseline indicator data is an average RSSI data calculated over some number of time intervals. In one example, the baseline indicator data is calculated at a night or a previous day. In one example, the baseline indicator data is calculated when there is no occupant in the area and accordingly defines the non-occupancy condition in the area. In one implementation, the RSSI data generated at the current time is compared with the baseline indicator data based on one or more parameters. In one example, the parameter is a frequency and a difference value (change) is determined in frequency between the generated RSSI data at the current time and the generated RSSI data at the earlier time. In another example, the parameter is a magnitude and a difference value (change) is determined in magnitude between the generated RSSI data at the current time and the generated RSSI data at the earlier time.

In one implementation, the detector 116 calculates a variation metric based on the rate of change and the difference value for each of the plurality of the times of signal reception. In one implementation, the detector 116 determines a sum of the variance metric based on the variation metric. In one implementation, the sum of the variance metric is summing of the variation metrics for each of the plurality of times at which the RSSI data is generated. In one example, the sum of the variance metric is a sum of the variance at the current time and the variance at the immediate preceding time multiplied by a decay factor. In another example, the sum of the variance metric is a rolling sum of variances within a set window of time. In one implementation, the detector 116 compares the sum of the variance metric with a rising transition threshold. The rising transition threshold is a minimum value of the sum of variance to determine that an occupancy condition exists in the area 105. The rising transition threshold is determined prior to generating of the RSSI data in real time.

In one implementation, the detector 116 detects an occupancy condition in the area 105 at the current time when the sum of the variance metric is greater than the rising transition threshold. The detector 116 sends an occupancy condition signal to the controller 120. In one implementation, the controller 120 turns ON the light source 104 upon receipt of the occupancy condition signal from detector 116.

In one implementation, the detector 116 compares the total sum of the variance with a falling transition threshold. The falling transition threshold is a maximum value of the sum of variance to determine that a non-occupancy condition exists in the area 105. The falling transition threshold is determined prior to generating of the RSSI data in real time. In one implementation, the detector 116 detects a non-occupancy condition in the area 105 at the current time when the total amount of the variation is less than the falling transition threshold. The detector 116 sends a non-occupancy condition signal to the controller 120. In one implementation, the controller 120 turns OFF the light source 104 upon receipt of the non-occupancy condition signal from detector 116.

When the area 105 was previously unoccupied (the light source 106 was OFF), the controller 120 responds to an occupancy determination by the detector 116 to apply power to the light source 106 to turn ON the source. When the area 105 was previously occupied (the light source 106 was ON), the controller 120 responds to a non-occupancy determination by the detector 116 to withdraw power from the light source 106 to turn OFF the source as described in greater detail below.

In one implementation, the detector 116 determines that the total amount of the variation at the current time falls between a rising transition threshold and a falling transition threshold. The detector 116 determines whether a non-occupancy condition or an occupancy condition exists at previous time (prior to the current time) among the plurality of times. In one implementation, the detector 116 determines that the occupancy condition exists at the current time when the occupancy condition existed at the previous time. In one example, the previous time is a beginning time among the each of the plurality of times and the non-occupancy condition exists in the beginning time. In one implementation, the detector 116 generates an occupancy detection signal upon detection of the occupancy condition. The controller 120 is configured to turn ON the light source 106 in response to the occupancy detection signal. In one implementation, the detector 116 determines that the non-occupancy condition exists at the current time when the non-occupancy condition existed at the previous time. In one example, the previous time is a beginning time among the plurality of times and the non-occupancy condition exists in the beginning time. In one implementation, the detector 116 generates a non-occupancy detection signal upon detection of the non-occupancy condition. The controller 120 is configured to turn OFF the light source 104 in response to the non-detection detection signal. Accordingly, implementation of the occupancy sensing system 102 is configured to locally control the light source of the lighting system.

As illustrated in FIG. 1, the system 102 includes a single transmitter (Tx) 108 receiver (Rx) 110 pair. The system 102, however, may include other implementations of the transmitters and the receivers in pairs. In one implementation the system 102 includes multiple Tx 108a-108n/Rx 108-108n pairs. In another implementation, the system 102 includes a multiple Tx 108a-108n and a single Rx 110. In another implementation, number of Tx and Rx is independent of the number of lighting devices 102. In another implementation, wireless topology of the Tx and Rx is independent wireless topology of the system of the lighting devices 102. Some examples of the Tx/Rx wireless topology are described herein below.

FIG. 2A illustrates an example of a wireless topology of a multi Tx/single Rx group 230 including four Tx 108a-108d and a single Rx 110 in the area 105. In this example, the area 105 is a room inside a building, home etc. Such a multi-Tx/single RX group 230 is installed in the room where each of the multiple Tx 108a-108d may be able to transmit the RF signals from four different locations of the room to the single Rx 110. In this example, the single RX 110 receives RF signals from four corresponding Tx 108a-108d. In one implementation, the single Rx 110 generates a single RSSI data based on a combination of RF signal strength of all four of the RF signals transmitted by each of the four Tx108a-108d. The single RSSI data is processed by the detector 116 to determine one of an occupancy condition or a non-occupancy condition of the entire room covered by the four Tx 108a-108d. In another implementation, the single Rx 110 generates four individual occupancy conditions based on RF signals from each of the Tx108a-108d and reports them separately. In another example, the single Rx 110 generates one aggregate occupancy condition that is based on a logical OR of the individual occupancy conditions corresponding to Tx108a-108d.

In one implementation, the multi Tx/single Rx group 230 is located in one or more lighting devices 104 in the area 105. In another implementation, each of the multi Tx 108a to Tx108d are located in one of the lighting devices 104a-104n (see e.g. FIG. 7) and the Rx 110 is located in another of the lighting devices 104a-104n (see e.g. FIG. 7) that is different from the one of the lighting devices 104a-104n (see e.g. FIG. 7). In another implementation, each of the multi Tx 108a-108d is located in their respective lighting devices 104a-104d (see e.g. FIG. 7) and the Rx is located in one of the respective lighting devices 104a-104d (see e.g. FIG. 7). In a further implementation, each of the multi Tx 108a-108d is located in their respective lighting devices 104a-104d (see e.g. FIG. 7) and the Rx is located in a lighting device 104 separate from the lighting devices 104a-104d (see e.g. FIG. 7). FIG. 2B illustrates an example of a linear wireless topology of a multi Tx/Rx group 240 having multiple Tx 108a-108n and multiple Rx 110a-110n in the area 105. In this example, the area 105 is a hallway of the indoor environment, the outdoor environment or a combination of the indoor or the outdoor environment. In this example, each of the multiple Tx 108a-108n linearly transmits the RF signals, as such each of the Rx110a-110n receives RF signals from two corresponding Tx among the multiple Tx108a-108n. In one implementation, the each of the Rx 110a-110n generates a single RSSI data based on a combination of RF signal strength of two of the RF signals transmitted by each of the two corresponding Tx among the multiple Tx 108a-108n. The single RSSI data is processed by the detector 116 to determine one of an occupancy condition or a non-occupancy condition of the entire hallway linearly from one end of hallway to the other end covered by the multiple Tx 108a-108n. In another implementation, each of Rx110a-110n generates two individual occupancy conditions based on RF signals from the two Tx among the Tx108a-108n and reports them separately. In another example, each of the Rx110a-110n generates one aggregate occupancy condition that is based on a logical OR of the individual occupancy conditions corresponding to the two Tx among the Tx108a-108n. In a further example, each of the Rx110a-110n generates one aggregate occupancy condition that is based on a logical OR of the individual occupancy conditions corresponding to the two Tx among the Tx108a-108n and an average value of output of the logical OR.

In one implementation, the multi-Tx/Rx group 240 is implemented linearly in one lighting device 104. In another implementation, each of a single Tx 108 and Rx 110 pair of the multi Tx/Rx group 240 is located in each of the respective lighting devices 104a-104n (see e.g. FIG. 7). FIG. 2C illustrates an example of a grid wireless topology of a multi Tx/Rx group 250 having Tx 108a-108n and multiple Rx 110a-110n in the area 105. In this example, the area 105 has a very large space such as a shopping store in an indoor environment. As shown, each of the Rx 110a-110n is coupled to two or more Tx 108a-108n along one or more various directions to receive RF signals from more than one Tx to cover a larger space in the area 105. In this example, each of the Rx 110a-110n receives RF signals from one of two, three or four Tx among the multiple Tx108a-108n. In one implementation, the single Rx 110 generates a single RSSI data based on a combination of RF signal strength from combination of RF signals transmitted by each of the two, three or four Tx among the multiple Tx108a-108n. The single RSSI data is processed by the detector 116 to determine one of, an occupancy condition or a non-occupancy condition of the entire area 105 covered by the multiple Tx108a-108n. In another implementation, the single Rx 110 generates four individual occupancy conditions based on RF signals from four Tx among the Tx108a-108n and reports them separately. In another example, each of the Rx110a-110n generates one aggregate occupancy condition that is based on a logical OR of the individual occupancy conditions corresponding to the four Tx among the Tx108a-108n. In a further example, each of the Rx110a-110n generates one aggregate occupancy condition that is based on a logical OR of the individual occupancy conditions corresponding to the four Tx among the Tx108a-108n and an average value of output of the logical OR.

In one implementation, the multi Tx/single Rx group 250 is located in one or more lighting devices 104 (see e.g. FIG. 7) in the area 105. In another implementation, each of the multi Tx 108a to Tx108n is located in one of the lighting devices 104a-104n (see e.g. FIG. 7) and each of the multi Rx 110a to Rx110n is located in another of the lighting devices 104a-104n that is different from the one of the lighting devices 104a-104n (see e.g. FIG. 7). In another implementation, each of the multi Tx 108a-108n is located in their respective lighting devices 104a-104n and the Rx 110a-110n are located in one of the respective lighting devices 104a-104n (see e.g. FIG. 7).

Figure 3:
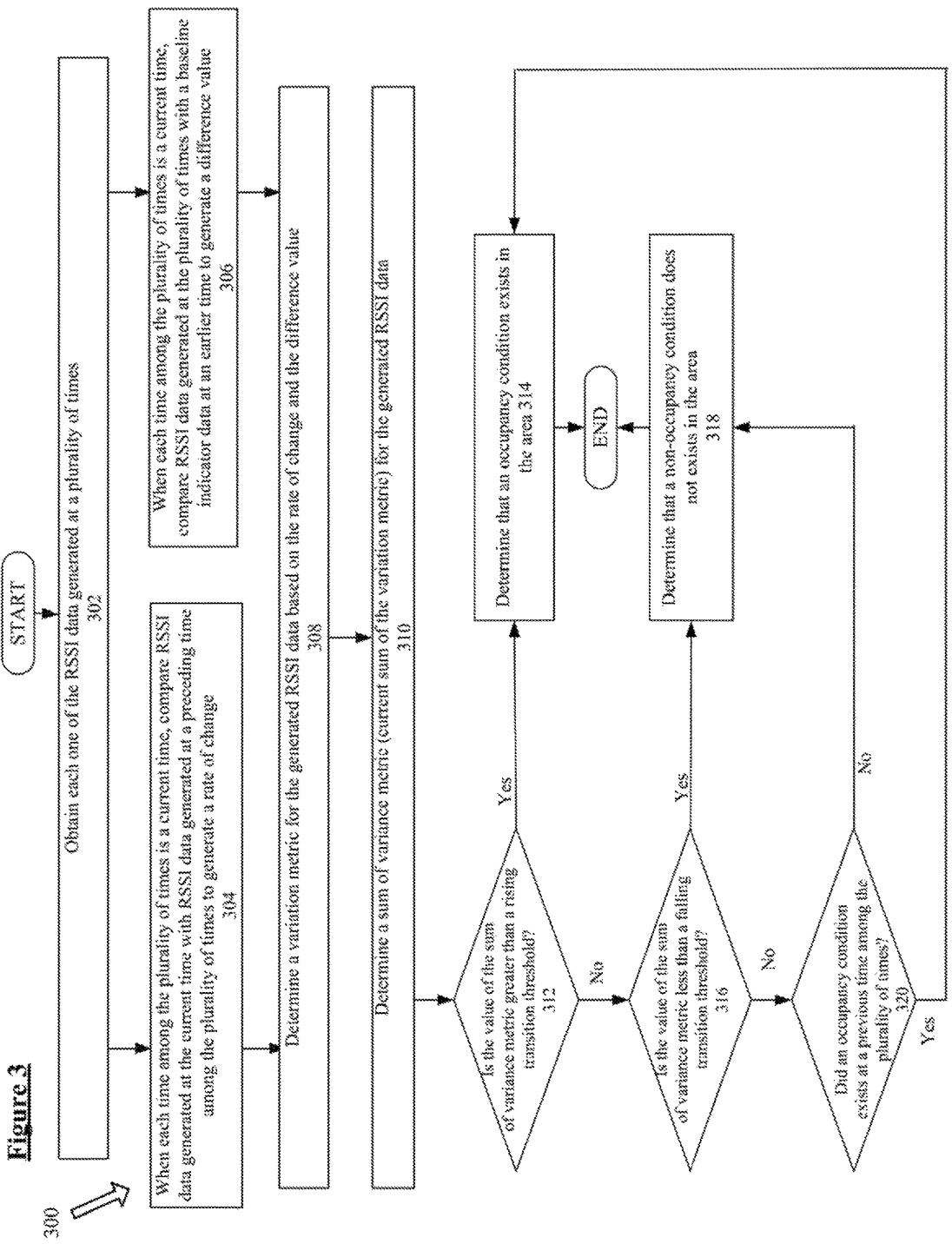
FIG. 3 illustrates an example of a method for determining an occupancy condition or non-occupancy condition in a lighting system.

FIG. 3 illustrates an example of a flowchart of a method 300 for determining an occupancy condition or non-occupancy condition in a lighting system. As discussed above, the lighting system (system) is disposed within a physical space/area such as a room, corridor, hallway, or doorway. In one implementation, indoor environment is described, but it is known to one of ordinary skill that the systems and methods described herein are operable in external environments as well. As discussed above, for the purpose of the present description, we use the RSSI data as the characteristics of the RF signal, to generate as the indicator data. In one implementation, the method 300 is implemented by the detector 116 of FIG. 1.

At block 302, RSSI data generated at plurality of times of signal reception is obtained. As discussed above, the RSSI data is generated based on measurement of the RF signal strength associated with the RF signal at each of the plurality of times.

At block 304, when each time among the plurality of times is a current time, RSSI data generated at the current time is compared with the RSSI data generated at a preceding time among the plurality of times to determine a rate of change. As discussed above, in one implementation, the preceding time is a time interval and the RSSI data generated at the preceding time is an average RSSI data determined over the time interval. The preceding time interval occurs before the current time. In one example, the preceding time interval occurs immediately before the current time. In one implementation, the RSSI data is compared utilizing one or more parameters. In one example, the parameter is a frequency and a change is determined in frequency between the RSSI data generated at the current time and the RSSI data generated at the preceding time. In another example, the parameter is a magnitude and change is determined in magnitude between the RSSI generated data at the current time and the RSSI data generated at the preceding time. In one implementation, a first difference ($A_i$) is calculated between each value of the RSSI data generated at the current time ($RSSI_i$) among the plurality of times and the value of the RSSI data generated at the preceding time, i.e. preceding time interval ($RSSI_{i-1}$) as shown below:

$$A_i = |RSSI_i - RSSI_{i-1}|$$

At block 306, when each time among the plurality of times is a current time, RSSI data generated at the plurality of times is compared with a baseline indicator data at an earlier time to generate a difference value. This earlier time occurs before each of the $RSSI_i$ among the plurality of times associated with the generated RSSI data. As discussed above, in one implementation, the baseline indicator data is calculated from RSSI data values at the earlier time, which is much longer time back before the current time. In one implementation the baseline indicator data is an average RSSI data calculated over some number of time intervals. In one example, the baseline indicator data is calculated at a night or a previous day. In one example, the baseline indicator data is calculated when there is no occupant in the area and accordingly defines the non-occupancy condition in the area. In one implementation, the RSSI data is compared utilizing one or more parameters. In one example, the parameter is a frequency and a change is determined in frequency between the RSSI data generated at the plurality of times and the baseline indicator data generated at the preceding time. In another example, the parameter is a magnitude and change is determined in magnitude between the RSSI data generated at the plurality of times and the baseline indicator data at the earlier time. In one implementation, as shown below, a second difference (Be) is calculated between each value of the RSSI data generated at the plurality of times and the pre-determined RSSI data value ($cal_0$) at the earlier time (i.e. Earlier time interval) as shown below:

$$B_i = |RSSI_i - cal0|$$

In one implementation, a maximum change value ($\Delta$ max) representing a maximum change, i.e. difference value allowed between each one of the RSSI data generated at each of the plurality of times is provided. The $\Delta$max is determined prior to generating of the RSSI data in real time. In one implementation, the maximum change value is dependent on factors such as rate at which the RSSI data is generated, signal noise, power integrity, signal integrity, etc. In one example, the maximum change value, $\Delta$max is 5. At block 308, a variation metric ($delta_i$) for the generated RSSI data is determined based on the rate of change and the difference value for each of the plurality of times. In one implementation, the variation metric ($delta_i$) is determined based on maximum value of the rate of change and the difference value subject to maximum change value ($\Delta$ max). Specifically, the rate of change is added to the difference value to the ($\Delta$ max) and a maximum value of the added rated of change and the difference value is determined as shown below.

$$delta_i = \max(A_i + B_i, \Delta\max)$$

Figure 4A:
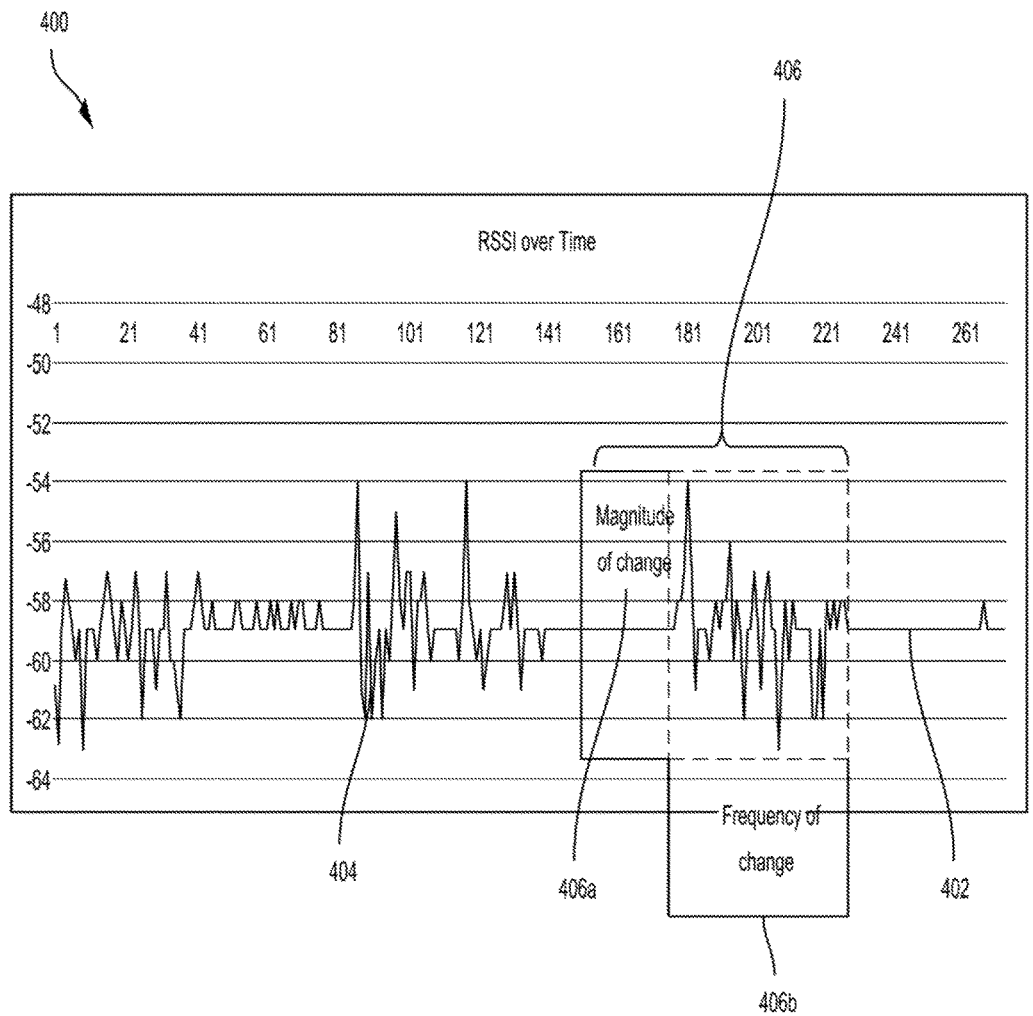
FIG. 4A illustrates an example of a graphical representation of radio signal strength indicator (RSSI) data over plurality of times.

Referring to FIG. 4A, there is shown a graphical representation 400 of RSSI data over the plurality of times. The y-axis defines measurement value in dB of the RSSI data and the x-axis defines each of the plurality of time in seconds. The baseline indicator data 402 is shown as a solid base line with the RSSI value of −59 dB. As illustrated, the value of the RSSI data 404 generated over a period of time varies (for example between −63 dB to −54 dB) and the variation metric ($delta_i$) 406 is displayed on the graphical representation 400. As shown, in one example, the variation metric ($delta_i$) 406 is a combination of magnitude of change 406a in the RSSI data and the frequency of change 406b in the RSSI data between the RSSI data generated at the current time with the average RSSI data at the preceding time and between the RSSI data generated at the current time with the pre-determined baseline indicator data at the earlier time.

Returning back to FIG. 3, at block 310, a sum of variance metric (current sum of the variation metric) (window$_i$) for the RSSI data generated at each of the current time over the plurality of times is determined. In one implementation, the sum of variance metric (window$_i$) is a sum of the variance at the current time and the variance at the immediate preceding time multiplied by a decay factor (k). As such, the (window$_i$) is determined by a summation of the square value of the delta$_i$ with the amount of change in a previous time (window$_{i-1}$) multiplied by the decay factor (k) as shown herein below.

$$\text{window}_i = k \times \text{window}_{i-1} + \text{delta}_i^2$$

In one implementation, the value of k is less than 1. In one example, the value of k is 0.95. In one implementation, the delta$_i$ is squared to magnify the larger changes in the generated RSSI data and to minimize the smaller changes in the generated RSSI data since it is the larger changes in the generated RSSI data that identify an occupant in the area. In one example, the small changes range between 1 dB to 2 dB from the baseline indicator data. In another example, the larger changes range between 4 dB-7 dB from the baseline indicator data.

In an alternate implementation, the sum of variance metric (window$_i$) is a rolling sum of variances within a set window of time and is calculated based on sum of delta$_i$ calculated over last m samples of generated from RSSI data as shown herein below.

$$\text{window}_i = \sum_{j=1}^{m} \text{delta}_j^2$$

In one example, m is the size of the rolling variance over which data is being processed. As an example, m is 21 and at 7 samples per second, it represents processing 3 seconds of data.

In one implementation, a rising transition threshold (threshold$_R$) value is determined prior to generating of the RSSI data in real time. The rising transition threshold is a minimum value of the sum of variance to determine that an occupancy condition exists in the area 105. The threshold$_R$ is a minimum value of the window$_i$ to detect that an occupancy condition exists in the area. In one example, the threshold$_R$ value is determined by multiplying a value of 3 with a square value of (Δ max) and adding a value of 1 as shown herein below.

$$\text{threshold}_R = 3 \times \Delta\text{max}^2 + 1$$

As discussed above, in one example, the maximum change value, Δmax is 5, thus the value of the threshold$_R$ is 76. In one implementation, a falling transition threshold (threshold$_F$) value is determined prior to generating of the RSSI data in real time. The threshold$_F$ is a maximum value of the windows to detect that an occupancy condition does not exist in the area, i.e. a non-occupancy condition exists. In one example the threshold$_F$ value is determined by dividing the threshold$_R$ by the value of 3 as shown herein below.

$$\text{threshold}_F = \frac{\text{threshold}_R}{3}$$

As discussed in the example above, the value of the threshold$_R$ is 76, thus the value of the threshold$_F$ is 25. At block 312, a decision is made to determine whether value of the sum of variance metric is greater than the rising transition threshold. When at block 312, it is determined that the value of the sum of variance metric is greater than the rising transition threshold, then at block 314, it is determined that the occupancy condition exists in the area. In one implementation, light is turned on in the area upon the determination that the occupancy condition exists. When at block 312, it is determined that the value of the sum of variance metric is not greater than the rising transition threshold, then at block 316 a decision is made whether the value of the sum of variance metric is less than the falling transition threshold. When at block 316, it is determined that the value of the sum of variance metric is less than the falling transition threshold, than at block 318, it is determined that a non-occupancy condition exists in the area. In one implementation, light is turned off in the area upon the determination that the occupancy condition exists in the area. When at block 316, it is determined that the value of the sum of variance metric is not less than the falling transition threshold, then at block 320 a decision is made whether at a previous time (prior to the current time) among the plurality of times an occupancy condition exists in the area. When at block 320, it is determined that the occupancy condition exists in the area, then block 314 is repeated. When at block 320, it is determined that the occupancy condition does not exists (i.e. non-occupancy condition exists) in the area, then block 318 is repeated. In one example, the previous time is a beginning time among the plurality of times and the non-occupancy condition exists in the beginning time.

Figure 4B:
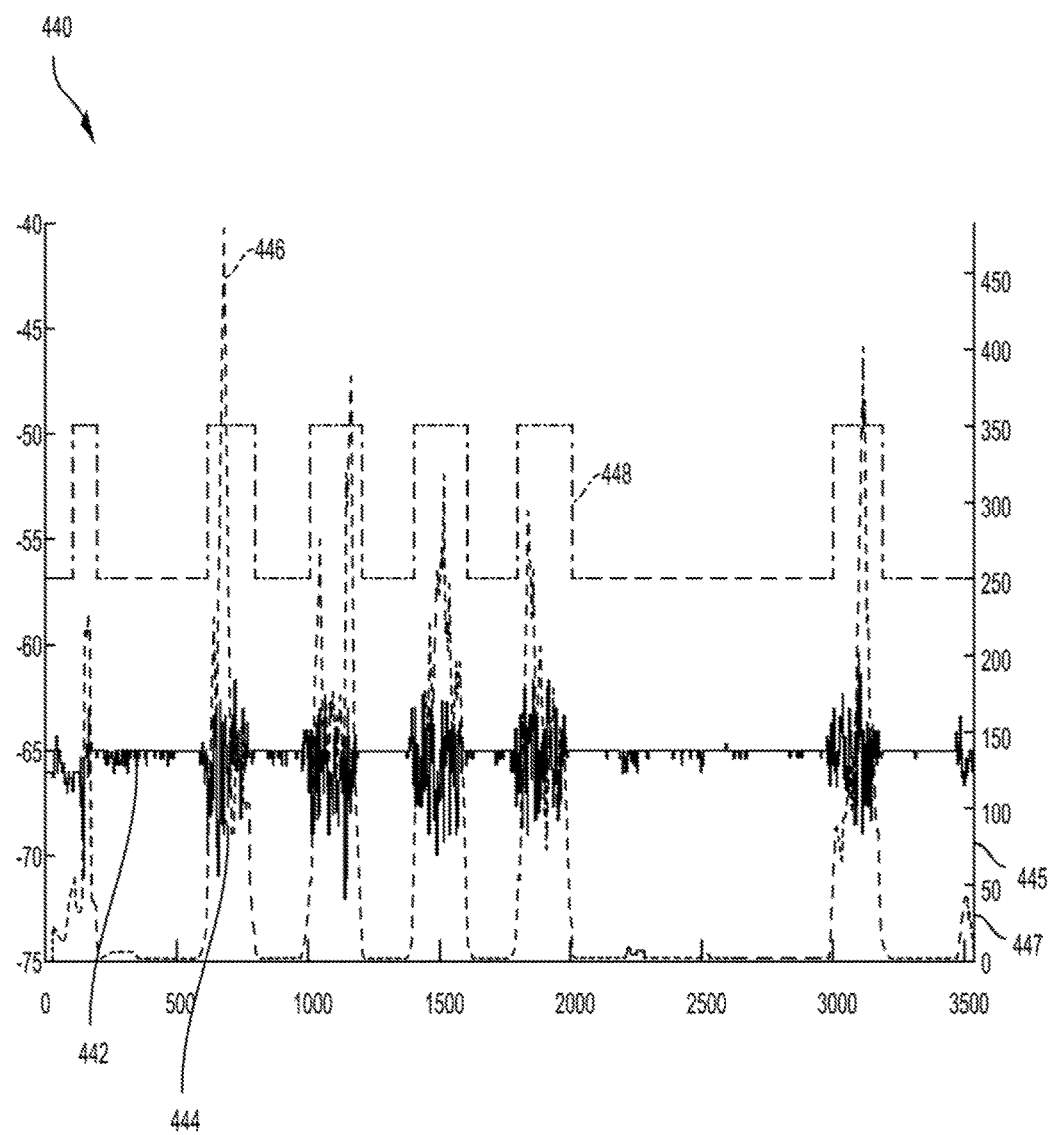
FIG. 4B, shows an example of a graphical representation of the, RSSI data, the total amount of variation of the RSSI data and the occupancy condition over plurality of times.

Referring to FIG. 4B, there is shown an example of a graphical representation 440 of the, RSSI data, the sum of the variance metric (window$_i$) and the occupancy condition over the plurality of times. The y-axis defines measurement value in dB of the RSSI data and the x-axis defines each of the plurality of times in seconds. The baseline indicator RSSI data 442 is shown as an approximately solid base line with the RSSI value of −65 dB. As illustrated, the value of the RSSI data 444 (illustrated as dashed lines) generated over a period of time varies for example between −72 dB to −59 dB. Also, shown is value of the sum of variance metric. i.e. the window$_i$, 446 (illustrated as dashed lines) varies between −75 dB to −40 dB. As illustrated in this example, the value of the threshold$_R$ 445 is 76 dB and the value of threshold$_F$ 447 is 25 dB. Further, an occupancy logic signal 448 is illustrated as a solid line, which indicates that the occupancy conditions exists in the area at the time when the value of the window$_i$, 446 varies between −56 dB and −50 dB. As discussed above the occupancy condition exists in the area when the sum of variance metric i.e. the window$_i$, 446 is either greater than the threshold$_R$ value 445. Also, as discussed above, the occupancy condition exists in the area when the sum of variance metric, i.e. the window$_i$, 446 is less than the threshold$_R$ value 445 but the occupancy logic signal 448 is ON (i.e. occupancy conditions exists) at a previous time before the current time. Further, as discussed above, the occupancy condition does not exists in the area when the sum of variance metric, i.e. the window$_i$ 446 is less than the threshold$_R$ value 445 and the occupancy logic signal 448 is OFF (i.e. occupancy condition does not exist) at a previous time before the current time. Further, as discussed above, the occupancy signal 448 is OFF (i.e. occupancy conditions does not exist) when sum of the variance metric, i.e. the window$_i$, 446 is less the threshold$_F$ value 447.

Figure 5A:
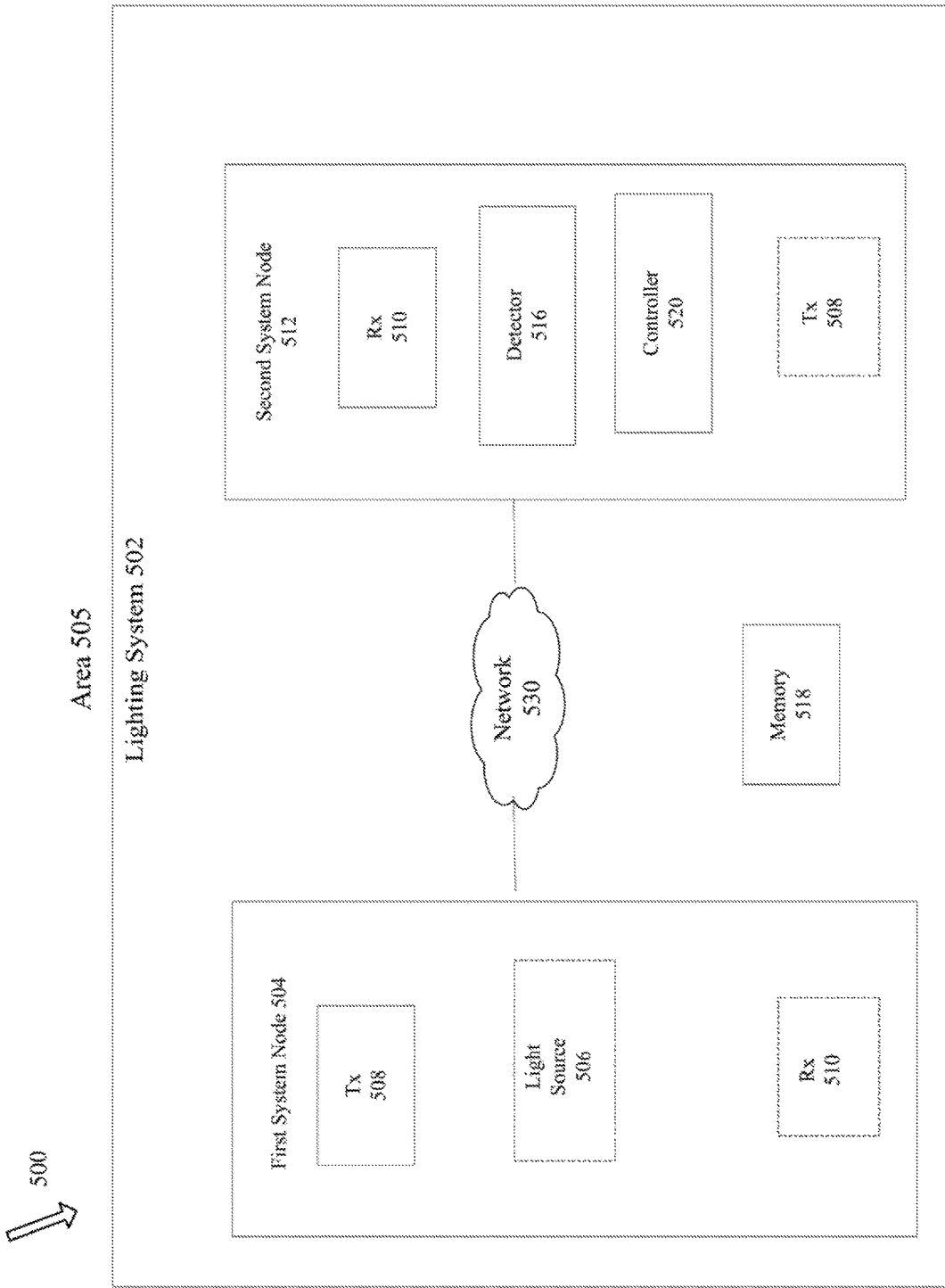
FIG. 5A illustrates a functional block diagram of an example of an occupancy sensing system in accordance with an implementation of a global control of a light source in a lighting system.

FIG. 5A illustrates a functional block diagram of an example of an occupancy sensing system 500 configured to function on a radio frequency (RF) wireless communication network in accordance with an implementation of a global control of a light source of a lighting system (system).

As shown, the occupancy system 500 includes a lighting system 502 disposed within a physical space/area 505 such as a room, corridor, hallway, or doorway. In one implementation, indoor environment is described, but it is known to one of ordinary skill that the systems and methods described herein are operable in external environments as well. The system 502 includes a first system node 504. In one implementation, the first system node 504 includes a wireless radio transmitter (Tx) 108 configured to transmit radio frequency (RF) signals. In an alternate implementation the first node. In an alternate implementation, the first system node 504 includes a light source 506 and is configured as a lighting device. The lighting device, for example, may take the form of a lamp, wall switch, sensor, light fixture, or other luminaire that incorporates the light source 506, where the light source by itself contains no intelligence or communication capability, such as one or more LEDs or the like, or a lamp (e.g. "regular light bulbs") of any suitable type. The light source 506 is configured to illuminate the area 505. In one example, the light source 506 is configured to illuminate portions or regions of the area 505.

Although the first system node 504 of FIG. 5A illustrates an implementation to include a single Tx 108, it is known of one of ordinary skill in the art that the first system node 504 may include multiple Txs 108a-108n (not shown). In an alternate implementation, the first system node 504 includes Rx 510. The second node 503 could also include Tx 108. The second node 503 could also be lighting device.

In one implementation, the system 502 includes a second system node 512 coupled to the first system node 504 via a radio frequency (RF) wireless communication network (network) 530. In one example, the network 530 is a BLE mesh. In one implementation, the first system node 504 includes one of a light source and is being configured as a lighting device, a user interface component and is being configured as a lighting controller, a switchable power connector and is being configured as a plug load controller or a sensor detector and is being configured as a lighting related sensor. In another implementation, the second system node 512 also includes one of a light source and is being configured as a lighting device, a user interface component and is being configured as a lighting controller, a switchable power connector and is being configured as a plug load controller or a sensor detector and is being configured as a lighting related sensor.

In one implementation, the second system node 512', is different from the first system node 504. In one implementation, the second system node 512 is a processing server that functions to generate the indictor data of the RF signals and process the generated indicator data of the RF signals and control operations of the elements (e.g. light source 506) in the first system node 504. As discussed above, the indicator data includes a plurality of characteristics of the RF signal at the plurality of times. Some of the characteristics include but are not limited to received signal strength indicator (RSSI) data, bit error rate, packet error rate, phase change etc. Also, as discussed above, for the purpose of the present example, we use RSSI data as the indicator data. In one implementation, the second system node 512 is a cloud computing system which includes a plurality of processing servers/machines, which work together or independently to process the indicator data of the RF signals and control operations of the elements (e.g. light source 506) in the first system node 504. In one implementation, second system node 512 includes a wireless radio receiver Rx 510 configured to receive RF signals, including signals from the Tx 508 in the first system node 504. In an alternate implementation, the second system node 512 also includes a Tx 508.

In one example, the first node 501 and the second node 503 includes the capabilities to communicate over two different RF bands, although the concepts discussed herein are applicable to devices that communicate with luminaries and other system elements via a single RF band. Hence, in the example, the Tx 508/Rx 510 may be configured for sending and receiving various types of data signals, and/or for pairing and commissioning messages. For example, the Tx 508/Rx 510 is configured as a 900 MHz transmitter for such an implementation on a variety of data that are transmitted and received over the 900 MHz band of the wireless network, includes control data, for example, turn lights on/off, dim up/down, set scene (e.g., a predetermined light setting), and sensor trip events. Alternatively, the TX 508/Rx 510 may be configured as a 2.4 GHz transmitter for Bluetooth low energy (BLE) that transmits and receives various messages related to commissioning and maintenance of a wireless lighting system.

In one implementation, benefits of the system include the ability to take advantage of Tx 508 and the Rx 510 (e.g. RF Tx and RF Rx) already installed in a location in the area 505, and because the system passively monitors signal broadcasts in the area 505 at plurality of times, it does not require (does not rely on) the occupants to carry any device.

Although FIG. 5A illustrates the Rx 510 inside the second system node 512, it is known to one of ordinary skill in the art that the one or more Rx 510 may be positioned inside the first system node 504. In an alternate implementation, one or more Tx 508 may be positioned within the second system node 512.

At a high level, the wireless communication transmitter Tx 508 transmits a RF for the plurality of times. The transmission may be specifically for the occupancy detection. In some cases, however, where the transmitter is in another lighting device or other lighting system element (e.g. a sensor or a wall switch), the transmissions are regular lighting related communications, such as reporting status, sending commands, reporting sensed events, etc. The wireless communication receiver Rx 510 receives the transmissions of the RF signal through the area 505 for each of the plurality of times of reception. At Rx 510, signal strength of the RF signal is measured and radio signal strength indicator (RSSI) data is generated of the RF signal at each of the plurality of times (reception times). The signal strength of each of the RF signal is based whether an occupant exists in a path between the Tx 508 and Rx 510 in the area 505.

In one implementation, the second system node 512 includes an occupancy/non-occupancy detector (detector) 516. In one implementation, the detector 516 functions similar to the detector 116 of FIG. 1 to determine one of an occupancy sensing or non-occupancy sensing condition in the area 505 with the exception that the occupancy sensing or the non-occupancy sensing condition is determined globally outside the first system node 504. The detector 516 is configured to process the RSSI data generated to generate an occupancy condition signal upon an occupancy detection in the area or a non-occupancy signal upon non-occupancy detection in the area at each of the plurality of times.

In one implementation, the second system node 512 also includes the controller 520. The controller 520 functions similar to the controller 120 of FIG. 1 with the exception that the controller 520 controls operation of the light source 506 globally from outside the first system node 504. In one implementation, the controller 520 is configured to turn ON the light source 506 in the lighting device 502 upon receipt of the occupancy condition signal from the detector 516. In one implementation, the controller 520 is configured to turn OFF the light source 506 in the lighting device 502 upon receipt of the non-occupancy condition signal from the detector 516. Accordingly, implementation of the occupancy sensing system 500 is configured to globally control the light source of the system 502.

Figure 5B:
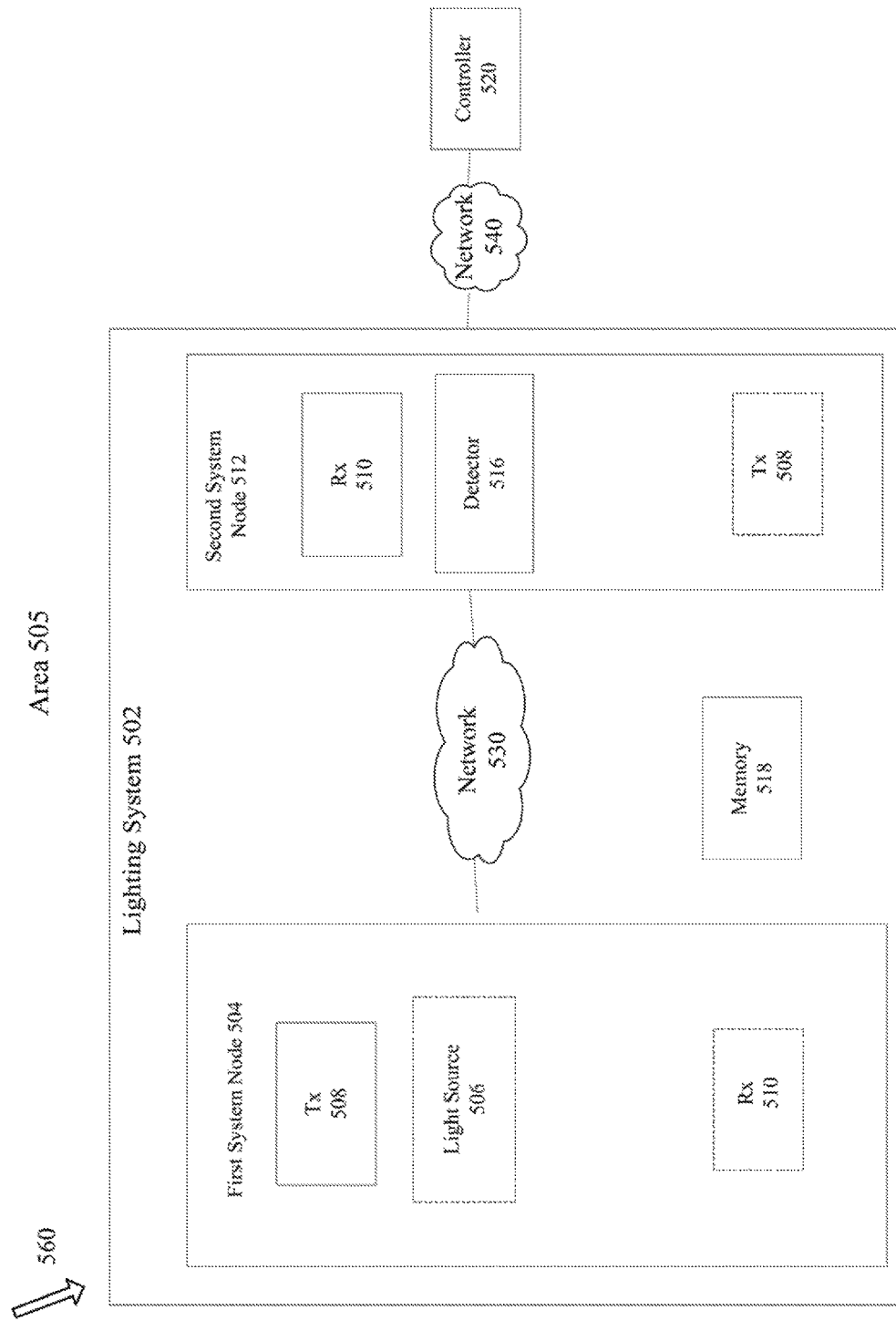
FIG. 5B illustrates a functional block diagram of another example of an occupancy sensing system in accordance with an implementation of a global control of a light source in a lighting system.

FIG. 5B illustrates a functional block diagram of another example of an occupancy sensing system 560 configured to function on the RF wireless communication network in accordance with the implementation of a global control of the light source of the light system (system 502). In one implementation, the occupancy sensing system 560 is similar to the occupancy sensing system 502 except the elements (e.g. light source 506) of the lighting system 502 is controlled remotely from the lighting system 502. In one implementation, the controller 520 is located outside the lighting system 502 and is coupled to the lighting system 502 via a communications network 540. In one implementation, the controller 520 is a cloud computing system which includes a plurality of processing servers/machines, which work together or independently to process the occupancy and non-occupancy signals to control operations of the elements (e.g. light source 506) of the lighting system 502. In one implementation, the communications network 540 is a wireless network. In one implementation, the communications network 540 is a BLE mesh. In one implementation, the communications network is a wired network. Accordingly, implementation of the occupancy sensing system 560 is configured to globally control the light source of the system 502.

FIG. 5C illustrates a functional block diagram of another example of an occupancy sensing system 580 configured to function on the RF wireless communication network in accordance with the implementation of the Tx 508 placed outside the lighting system 502. In one implementation, all the elements in the occupancy sensing system 580 such as Tx 508 R 510, detector 516, memory 518 and controller 520 function similar to elements described with respect to FIG. 5A with the exception that the Tx 508 transmits RF signals outside the lighting system 502. The lighting system 502 includes the light source 506.

FIG. 6 illustrates an example of a wireless topology 600 of a lighting system 602 with a multi Tx/Rx group pairs in a machine learning (ML) implementation. Specifically In this example, an area 605 includes a combination of a first room 640, a second room 660 and a hallway 680. The first and the second rooms 640 and 660 respectively are separated by a first wall 670. The hallway 680 is separated by the first and the second rooms 640 and 660 respectively by a second wall 690. As shown, each of the first and the second rooms 640 and 660 include a lighting device 604 and a Tx 108/Rx 110 pair. The hallway 680 includes two lighting devices 404 and their respective pairs of Tx 108/Rx 110. In one implementation, one of the occupancy condition and the non-occupancy condition in the area 605 is detected according to the occupancy sensing system 560 with the global control of the light source of the lighting system as described with respect to FIG. 5B above with the controller 520 located outside the lighting system 602 and is coupled to the lighting system 502 via the communications network 540. In one implementation, the communications network 540 is a wireless network. In one implementation, the communications network 540 is a BLE mesh. In one implementation, the communications network 540 is a wired network.

In the wireless topology 600 each of the Tx 108a-Tx108c of the Tx 108/Rx 110 pair in the area 605 transmits RF signals, which is received by its corresponding Rx 110a-Rx110c in the Tx 108/Rx 110 pair and also received by other of the Rx 110a-Rx 110c of the Tx 108/Rx 110 pairs in the area 605. Accordingly, each of the Rx110a-Rx110c 110 is configured to detect one of an occupancy condition and a non-occupancy condition in its own region (first room 640 or second room 660 or the hallway 680) based on the multiple RF signals received globally from the multiple Tx 108 in the area 605. Thus, for example, a person in the first room 640 is detected by the Tx108/RX 110 (in the first room 640), which generates an occupancy signal. A person in the first room 640 can also trigger a response in the second room 660 by the Tx 108/RX 110 in the second room 660, but at a lower RSSI signal level. An RSSI signal level threshold may be used to reject the false positive in the second room 660. A similar threshold approach may be implemented to prevent false positives at the nodes i.e. Tx108c/Rx110c in the hallway 680.

The Rx 110a of the first room 640 is configured to detect one of an inaccurate occupancy or inaccurate non-occupancy condition in the first room 640 since it receives RF signals not only from its own Tx 108a in the first room 640 but also receives RF signals from the Tx 108b in the second room 660 and receives RF signals from the Tx 108c in the hallway 680. In one implementation, a machine learning (ML) algorithm is applied to allow the Rx 110a in the first room 640 to ignore/eliminate the RF signals received from the Tx 108b in the second room 660 and the Tx 108c from the hallway 680 and/or multipath returns of signals generated by the Tx 108a in the first room 640 but received due to or modified by the presence of occupants in the second room 660 or in the hallway 680.

In general, a machine learning algorithm, such as a neural network, "learns" how to manipulate various inputs, possibly including previously generated outputs, in order to generate current new outputs. As part of this learning process, the algorithm receives feedback on prior outputs and possibly some other inputs. Then, the neural network or the like calculates weights to be associated with the various inputs (e.g. the previous outputs, feedback, etc.). The weights are then utilized by the neural network to manipulate the inputs and generate the current outputs intended to improve some aspect of system performance in a desired manner. For machine learning, the training data is the discrepancy between the outputs of a present system and the outputs of a trusted system.

In a lighting system with occupancy detection, the training data is the discrepancy between the outputs of an RF based detection system operating in a user/consumer installation and a trusted occupancy detection system such as a standard occupancy sensor (e.g. such as a sensor using passive infrared (PIR) of or a camera based system). Machine learning techniques such as artificial neural networks are applied to reduce the discrepancy. Training can take place ahead of the time (before product release/commissioning) or in the field as an on-going optimization to reduce false positives in detecting an occupant.

An example may apply a "supervised learning" approach in which the system will be provided a "known answer" from a "trusted detector" and machine learning is used to optimize the occupancy/non-occupancy detect algorithm to minimize the difference between the system output and the "known answer." A trusted detector may be a passive infrared occupancy detector or a camera. The particular machine learning approach can be one of decision tree or artificial neural net.

Learning can take place prior to shipping product or as part of commissioning after installation. In either of those cases, the system normally will operate in the field without a trusted detector.

Alternatively, a trusted detector can be installed with the system in the field, in which case, there may be on-going machine learning. For an ongoing learning implementation, the data can be routed to a cloud, learning can take place on another system, and then the improved algorithm (e.g. in the form of new node parameters in the case of a neural network) can be downloaded to the installed lighting system.

Figure 7:
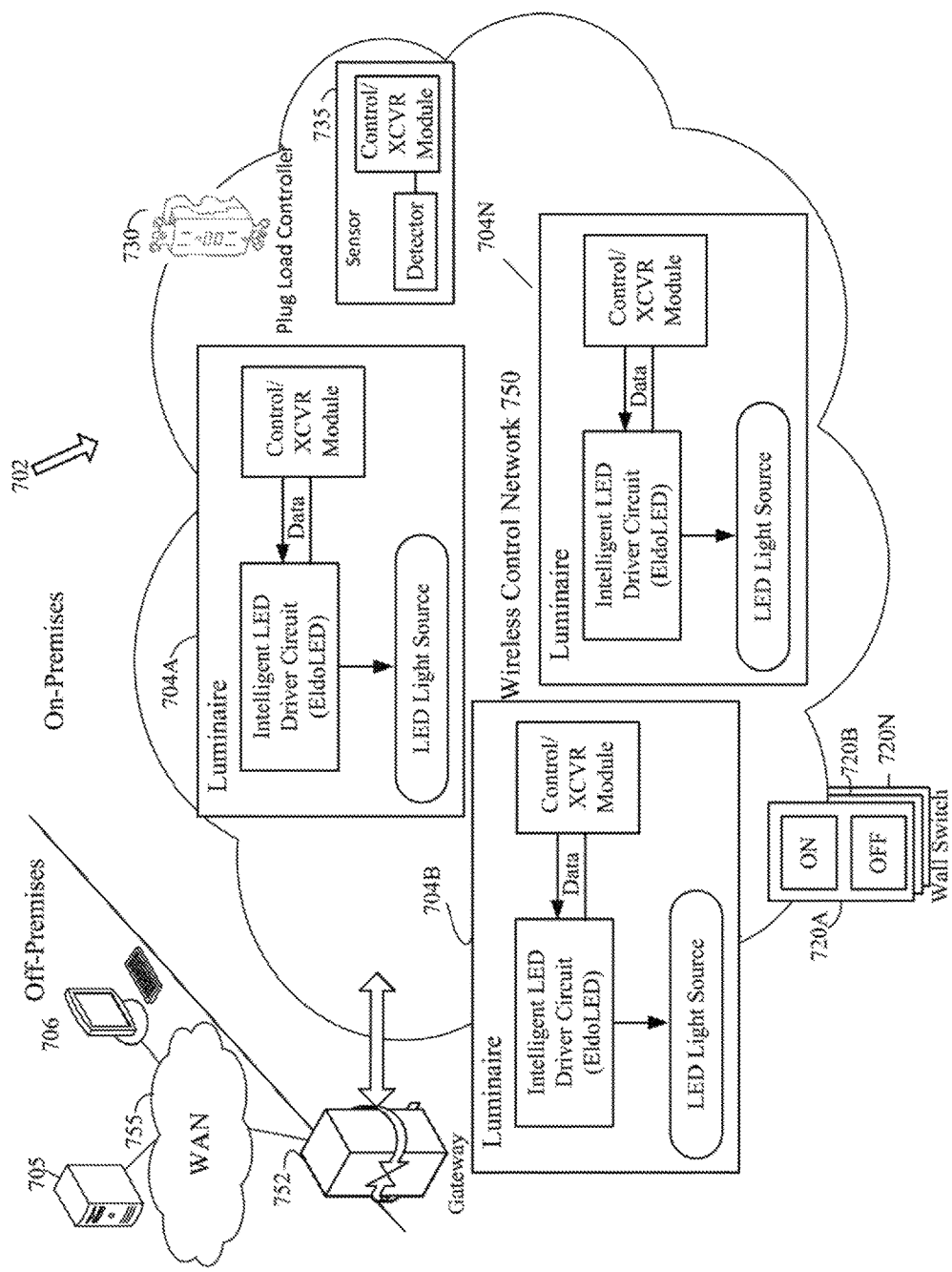
FIG. 7 is a functional block diagram illustrating an example relating to a lighting system of network and devices that provide a variety of lighting capabilities.

FIG. 7 is a functional block diagram illustrating an example relating to a system of a wireless network and devices that provide a variety of lighting capabilities, including communications in support of lighting functions such as turning lights on/off, dimming, set scene, or sensor trip events. It should be understood that the term "lighting control device" means a device that includes a controller (Control/XCR module or micro-control unit) that executes a lighting application for communication over a wireless lighting network communication band, of control and systems operations information during control network operation over the lighting network communication band.

A lighting system 702 may be designed for indoor commercial spaces, although the system may be used in outdoor or residential settings. As shown, system 702 includes a variety of lighting control devices, such as a set of lighting devices (a.k.a. luminaries) 104a-104n (lighting fixtures), a set of wall switch type user interface component (a.k.a. wall switches) 720a-720n, a plug load controller type element (a.k.a. plug load controller) 730 and a sensor type element (a.k.a. sensor) 735. Daylight, ambient light, or audio sensors may embedded in lighting devices, in this case luminaries 704a-704n. RF wireless occupancy sensing as described above is implemented in one or more of the luminaries 704a-704n to enable occupancy/non-occupancy based control of the light sources. One or more luminaries may exist in a wireless network 750, for example, a sub-GHz or Bluetooth (e.g. 2.4 GHz) network defined by an RF channel and a luminaire identifier.

The wireless network 750 may use any available standard technology, such as WiFi, Bluetooth, ZigBee, etc. An example of a lighting system using a wireless network, such as Bluetooth low energy (BLE), is disclosed in patent application publication US 20160248506 A1 entitled "System and Method for Communication with a Mobile Device Via a Positioning System Including RF Communication Devices and Modulated Beacon Light Sources," the entire contents of which are incorporated herein by reference. Alternatively, the wireless network may use a proprietary protocol and/or operate in an available unregulated frequency band, such as the protocol implemented in nLight® Air products, which transport lighting control messages on the 900 MHz band (an example of which is disclosed in U.S. patent application Ser. No. 15/214,962, filed Jul. 20, 2016, entitled "Protocol for Lighting Control Via a Wireless Network," the entire contents of which are incorporated herein by reference). The system may support a number of different lighting control protocols, for example, for installations in which consumer selected luminaries of different types are configured for a number different lighting control protocols.

The system 702 also includes a gateway 752, which engages in communication between the lighting system 702 and a server 705 through a network such as wide area network (WAN) 755. Although FIG. 7 depicts server 705 as located off premises and accessible via the WAN 755, any one of the luminaries 704a-704n, for example are configured to communicate one of a occupancy detection or a non-occupancy detection in an area to devices such as the server 705 or even a laptop 706 located off premises.

The lighting control 702 can be deployed in standalone or integrated environments. System 702 can be an integrated deployment, or a deployment of standalone groups with no gateway 752. One or more groups of lighting system 702 may operate independently of one another with no backhaul connections to other networks.

Lighting system 702 can leverage existing sensor and fixture control capabilities of Acuity Brands Lighting's commercially available nLight® wired product through firmware reuse. In general, Acuity Brands Lighting's nLight® wired product provides the lighting control applications. However, the illustrated lighting system 704 includes a communications backbone and includes model—transport, network, media access control (MAC)/physical layer (PHY) functions.

Lighting control 702 may comprise a mix and match of various indoor systems, wired lighting systems (nLight® wired), emergency, and outdoor (dark to light) products that are networked together to form a collaborative and unified lighting solution. Additional control devices and lighting fixtures, gateway(s) 750 for backhaul connection, time sync control, data collection and management capabilities, and interoperation with the Acuity Brands Lighting's commercially available SensorView product may also be provided.

Figure 8:
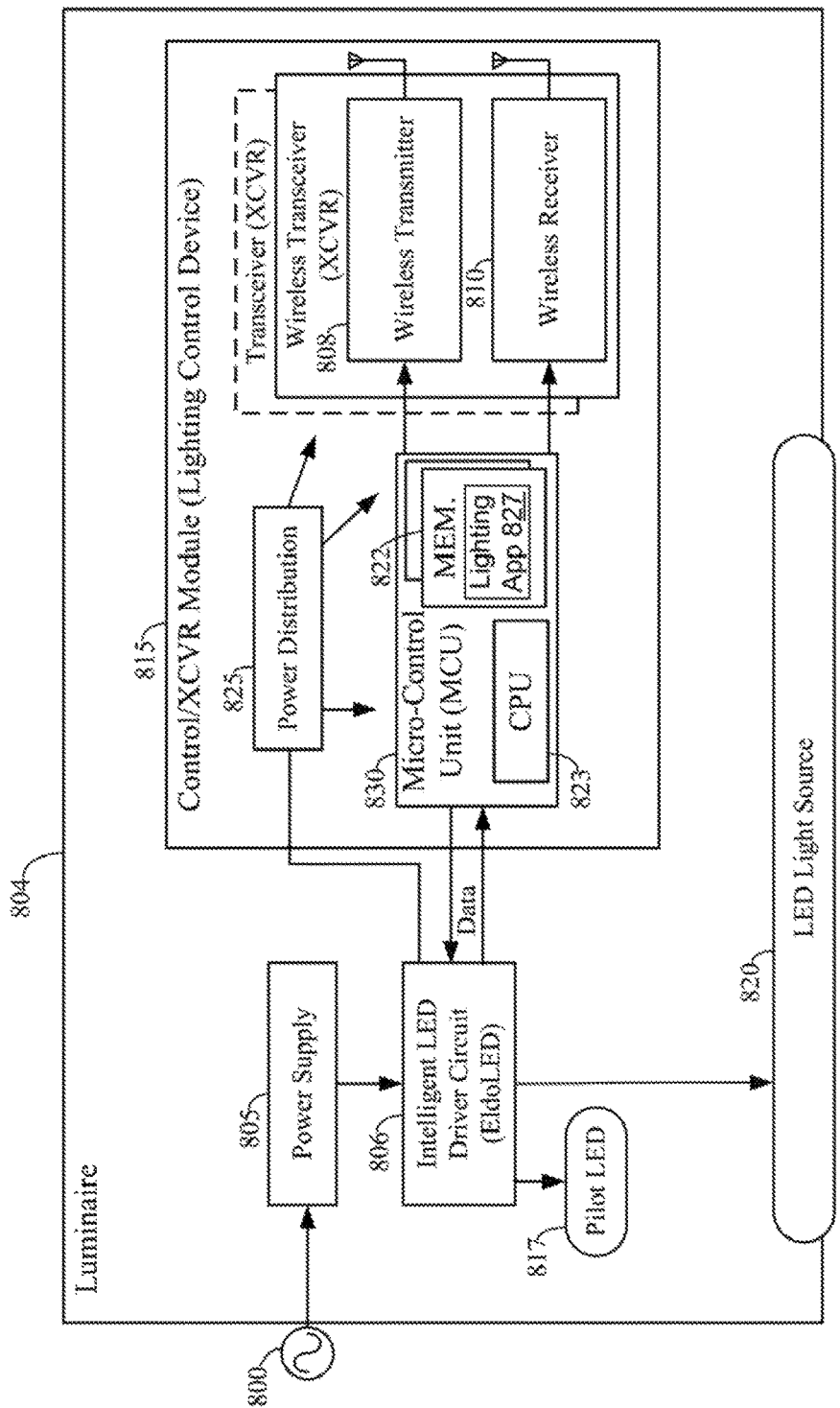
FIG. 8 is a block diagram of lighting device that operates in and communicates via the lighting system of FIG. 7.

FIG. 8 is a block diagram of a lighting device (in this example, a luminaire) 804 that operates in and communicates via the lighting system 702 of FIG. 7. Luminaire 804 is an integrated light fixture that generally includes a power supply 805 driven by a power source 800. Power supply 805 receives power from the power source 800, such as an AC mains, battery, solar panel, or any other AC or DC source. Power supply 805 may include a magnetic transformer, electronic transformer, switching converter, rectifier, or any other similar type of circuit to convert an input power signal into a power signal suitable for luminaire 804.

Luminaire 804 furthers include an intelligent LED driver circuit 806, control/XCVR module 815, and a light emitting diode (LED) light source 820. Intelligent LED driver circuit 806 is coupled to LED light source 820 and drives that LED light source 820 by regulating the power to LED light source 820 by providing a constant quantity or power to LED light source 320 as its electrical properties change with temperature, for example. The intelligent LED driver circuit 806 includes a driver circuit that provides power to LED light source 820 and a pilot LED 817. The pilot LED 817 may be included as part of the control/XCVR module 315. Intelligent LED driver circuit 806 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 806 is manufactured by EldoLED.

LED driver circuit 806 can further include an AC or DC current source or voltage source, a regulator, an amplifier (such as a linear amplifier or switching amplifier), a buck, boost, or buck/boost converter, or any other similar type of circuit or component. LED driver circuit 806 outputs a variable voltage or current to the LED light source 820 that may include a DC offset, such that its average value is nonzero, and/or an AC voltage.

Control/XCR module 815 includes power distribution circuitry 825 and a micro-control unit (MCU) 830. As shown, MCU 830 is coupled to LED driver circuit 806 and controls the light source operation of the LED light source 820. MCU 830 includes a memory 322 (volatile and non-volatile) and a central processing unit (CPU) 823. The memory 822 includes a lighting application 827 (which can be firmware) for both occupancy detection and lighting control operations. The power distribution circuitry 825 distributes power and ground voltages to the MCU 830, wireless transmitter 808 and wireless receiver 810, to provide reliable operation of the various circuitry on the sensor/control module 815 chip.

Luminaire 804 also includes a wireless radio communication interface system configured for two way wireless communication on at least one band. Optionally, the wireless radio communication interface system may be a dual-band system. It should be understood that "dual-band" means communications over two separate RF bands. The communication over the two separate RF bands can occur simultaneously (concurrently); however, it should be understood that the communication over the two separate RF bands may not actually occur simultaneously.

In our example, luminaire 804 has a radio set that includes radio transmitter 808 as well as a radio receiver 810, together forming a radio transceiver. The wireless transmitter 808 transmits RF signals on the lighting network. This wireless transmitter 808 wireless communication of control and systems operations information, during luminaire operation and during transmission over the first wireless communication band. The wireless receiver carries out receiving of the RF signals from other system elements on the network and generating RSSI data based on signal strengths of the received RF signals. If provided (optional) another transceiver (Tx and Rx) may be provided, for example, for point-to-point communication, over a second different wireless communication bands, e.g. for communication of information other than the control and systems operations information, concurrently with at least some communications over the first wireless communication band. Optionally, the luminaire 804 may have a radio set forming a second transceiver (shown in dotted lines, transmitter and receiver not separately shown).

The included transceiver (solid lines), for example, may be a sub GHz transceiver or a Bluetooth transceiver configured to operate in a standard GHz band. A dual-band implementation might include two transceivers for different bands, e.g. for a sub GHz band and a GHz band for Bluetooth or the like. Additional transceivers may be provided. The particular bands/transceivers are described here by way of non-limiting example, only.

If two bands are supported, the two bands may be for different applications, e.g. lighting system operational communications and system element maintenance/commissioning. Alternatively, the two bands may support traffic segregation, e.g. one band may be allocated to communications of the entity owning/operating the system at the premises whereas the other band may be allocated to communications of a different entity such as the system manufacturer or a maintenance service bureau.

The MCU 830 may be a system on a chip. Alternatively, a system on a chip may include the transmitter 808 and receiver 810 as well as the circuitry of the MCU 830.

As shown, the MCU 830 includes programming in the memory 822. A portion of the programming configures the CPU (processor) 823 to detect one of an occupancy or non-occupancy condition in an area in the lighting network, including the communications over one or more wireless communication. The programming in the memory 822 includes a real-time operating system (RTOS) and further includes a lighting application 827 which is firmware/software that engages in communications with controlling of the light source based on one of the occupancy or non-occupancy condition detected by the CPU 823. The lighting application 827 programming in the memory 822 carries out lighting control operations over the lighting network 750 of FIG. 7. The programming for the detection of an occupancy or non-occupancy condition in the area may be implemented as part of the RTOS, as part of the lighting application 827, as a standalone application program, or as other instructions in the memory.

Figure 9:
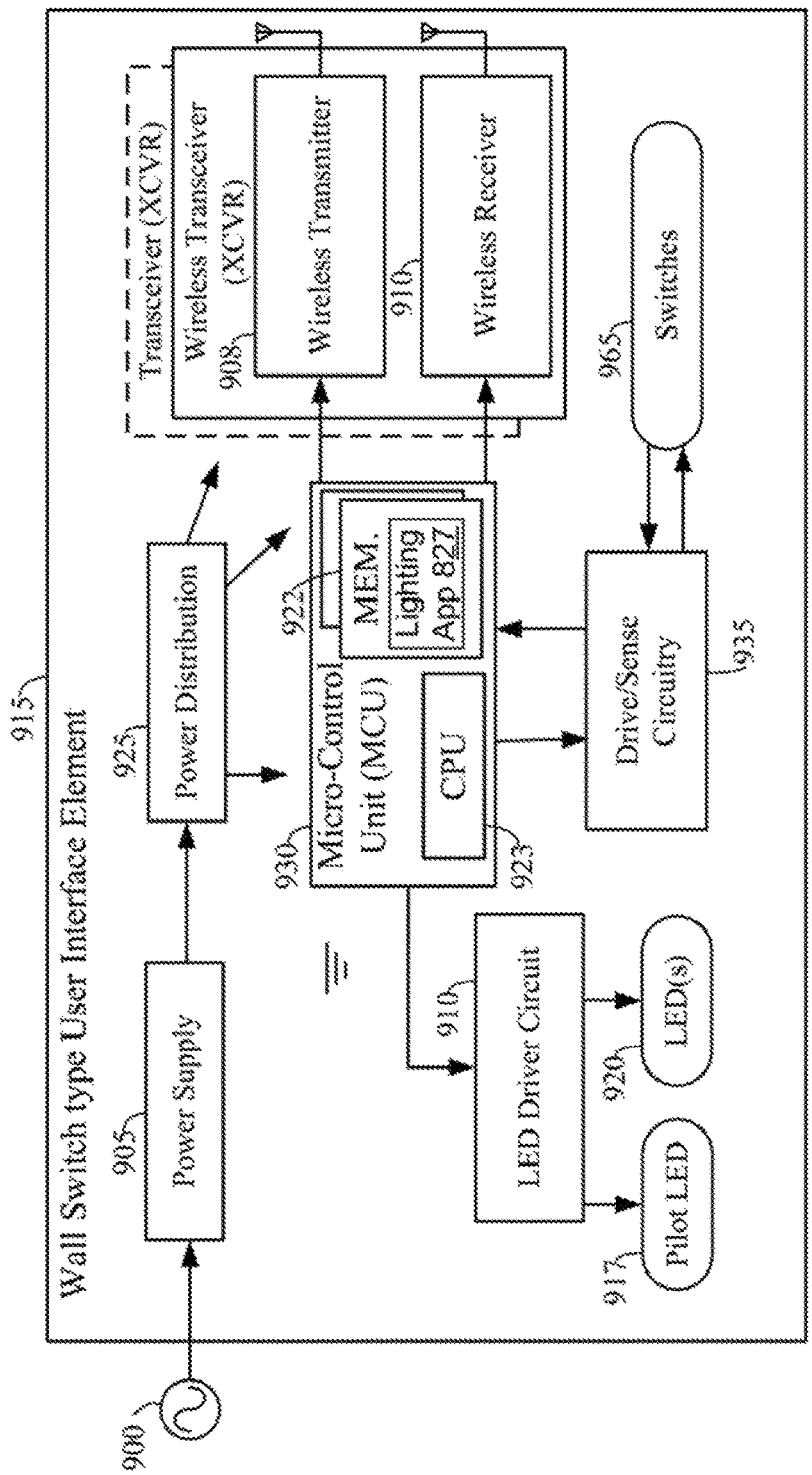
FIG. 9 is a block diagram of a wall switch type user interface element that operates in and communicates via the lighting system of FIG. 7.

FIG. 9 is a block diagram of a wall type user interface element 915 that operates in and communicates via the lighting system 702 of FIG. 7. Wall type user interface (UI) element (UI element) is an integrated wall switch that generally includes a power supply 905 driven by a power source 900. Power supply 905 receives power from the power source 900, such as an AC mains, battery, solar panel, or any other AC or DC source. Power supply 905 may include a magnetic transformer, electronic transformer, switching converter, rectifier, or any other similar type of circuit to convert an input power signal into a power signal suitable for the UI element 915.

UI element 915 furthers includes an intelligent LED driver circuit 910, coupled to LED (s) 920 and drives that LED light source (LED) 920 by regulating the power to LED 820 by providing a constant quantity or power to LED 920 as its electrical properties change with temperature, for example. The intelligent LED driver circuit 910 includes a driver circuit that provides power to LED 920 and a pilot LED 917. Intelligent LED driver circuit 910 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 910 is manufactured by EldoLED.

LED driver circuit 910 can further include an AC or DC current source or voltage source, a regulator, an amplifier (such as a linear amplifier or switching amplifier), a buck, boost, or buck/boost converter, or any other similar type of circuit or component. LED driver circuit 910 outputs a variable voltage or current to the LED light source 920 that may include a DC offset, such that its average value is nonzero, and/or an AC voltage.

The UI element 915 includes power distribution circuitry 925 and a micro-control unit (MCU) 930. As shown, MCU 930 is coupled to LED driver circuit 910 and controls the light source operation of the LED 920. MCU 930 includes a memory 922 (volatile and non-volatile) and a central processing unit (CPU) 923. The memory 922 includes a lighting application 927 (which can be firmware) for both occupancy detection and lighting control operations. The power distribution circuitry 925 distributes power and ground voltages to the MCU 930, wireless transmitter 908 and wireless receiver 910, to provide reliable operation of the various circuitry on the UI element 915 chip.

The UI element 915 also includes a wireless radio communication interface system configured for two way wireless communication on at least one band. Optionally, the wireless radio communication interface system may be a dual-band system. It should be understood that "dual-band" means communications over two separate RF bands. The communication over the two separate RF bands can occur simultaneously (concurrently); however, it should be understood that the communication over the two separate RF bands may not actually occur simultaneously.

In our example, the UI element 915 has a radio set that includes radio transmitter 908 as well as a radio receiver 910 together forming a radio transceiver. The wireless transmitter 908 transmits RF signals on the lighting network. This wireless transmitter 908 wireless communication of control and systems operations information, during luminaire operation and during transmission over the first wireless communication band. The wireless receiver carries out receiving of the RF signals from other system elements on the network and generating RSSI data based on signal strengths of the received RF signals. If provided (optional) another transceiver (Tx and Rx) may be provided, for example, for point-to-point communication, over a second different wireless communication bands, e.g. for communication of information other than the control and systems operations information, concurrently with at least some communications over the first wireless communication band. Optionally, the UI element 915 may have a radio set forming a second transceiver (shown in dotted lines, transmitter and receiver not separately shown).

The included transceiver (solid lines), for example, may be a sub GHz transceiver or a Bluetooth transceiver configured to operate in a standard GHz band. A dual-band implementation might include two transceivers for different bands, e.g. for a sub GHz band and a GHz band for Bluetooth or the like. Additional transceivers may be provided. The particular bands/transceivers are described here by way of non-limiting example, only.

If two bands are supported, the two bands may be for different applications, e.g. lighting system operational communications and system element maintenance/commissioning. Alternatively, the two bands may support traffic segregation, e.g. one band may be allocated to communications of the entity owning/operating the system at the premises whereas the other band may be allocated to communications of a different entity such as the system manufacturer or a maintenance service bureau.

The MCU 930 may be a system on a chip. Alternatively, a system on a chip may include the transmitter 908 and receiver 910 as well as the circuitry of the MCU 930.

As shown, the UI element 915 includes a drive/sense circuitry 935, such as an application firmware, drives the occupancy, audio, and photo sensor hardware. The drive/sense circuitry 935 detects state changes (such as change of occupancy, audio or daylight sensor or switch to turn lighting on/off, dim up/down or set scene) via switches 965, such as a dimmer switch, set scene switch. Switches 965 can be or include sensors, such as infrared sensors for occupancy or motion detection, an in-fixture daylight sensor, an audio sensor, a temperature sensor, or other environmental sensor. Switches 965 may be based on Acuity Brands Lighting's commercially available xPoint® Wireless ES7 product.

Also, as shown, the MCU 930 includes programming in the memory 922. A portion of the programming configures the CPU (processor) 923 to detect one of an occupancy or non-occupancy condition in an area in the lighting network, including the communications over one or more wireless communication bands. The programming in the memory 922 includes a real-time operating system (RTOS) and further includes a lighting application 927 which is firmware/software that engages in communications with controlling of the light source based on one of the occupancy or non-occupancy condition detected by the CPU 923. As shown, a drive/sense circuitry detects a state change event.

The lighting application 927 programming in the memory 922 carries out lighting control operations over the lighting system 702 of FIG. 7. The programming for the detection of an occupancy or non-occupancy condition in the area may be implemented as part of the RTOS, as part of the lighting application 927, as a standalone application program, or as other instructions in the memory.

Figure 10:
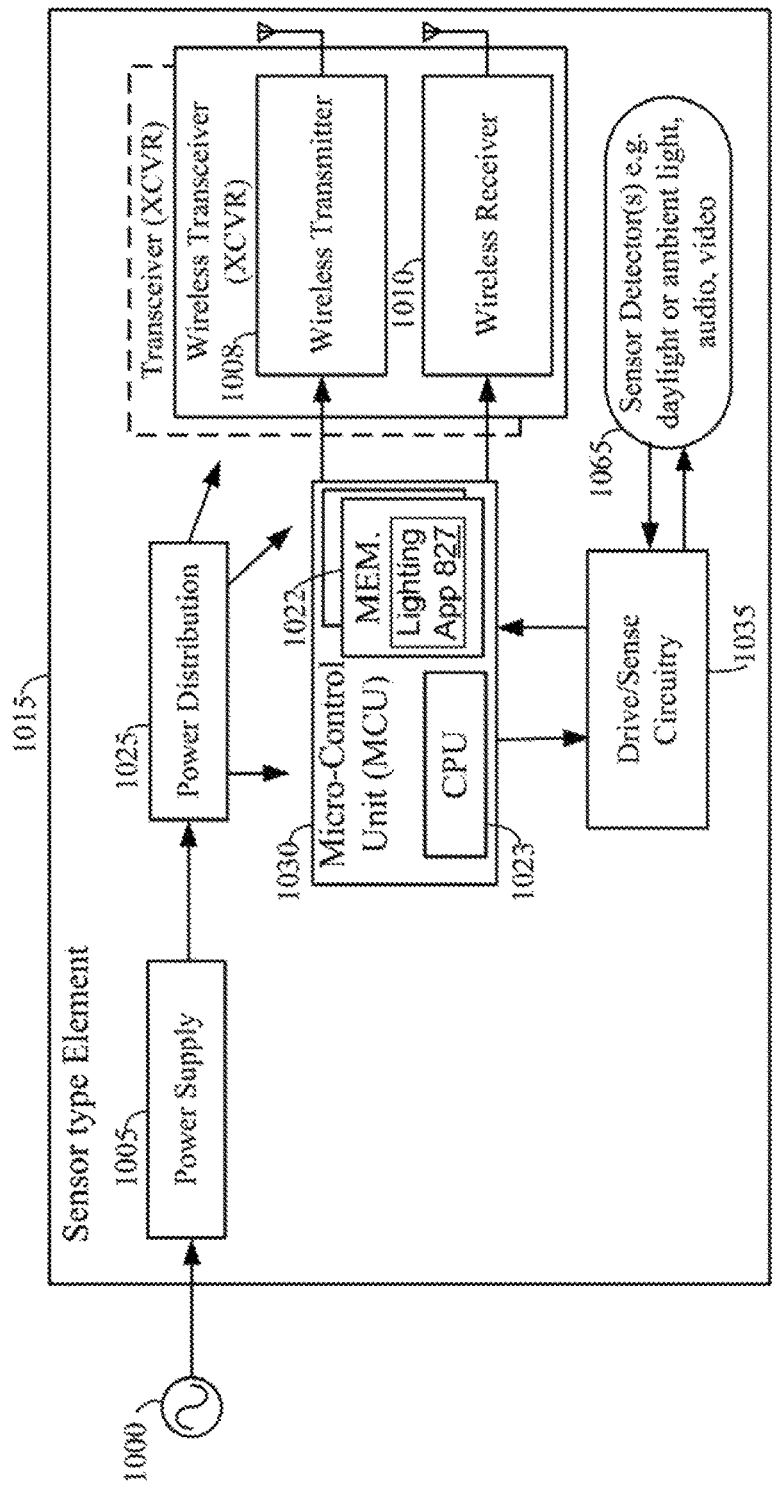
FIG. 10 is a block diagram of a sensor type element that operates in and communicates via the lighting system of FIG. 7.

FIG. 10 is a block diagram of a sensor type element, 1015 that operates in and communicates via the lighting system 702 of FIG. 7. Sensor type element is an integrated sensor detector that generally includes a power supply 1005 driven by a power source 1000. Power supply 805 receives power from the power source 1000, such as an AC mains, battery, solar panel, or any other AC or DC source. Power supply 1005 may include a magnetic transformer, electronic transformer, switching converter, rectifier, or any other similar type of circuit to convert an input power signal into a power signal suitable for the sensor type element 1015.

The sensor type element 1015 includes power distribution circuitry 1025 and a micro-control unit (MCU) 1030. As shown, MCU 1030 includes a memory 1022 (volatile and non-volatile) and a central processing unit (CPU) 1023. The memory 1022 includes a lighting application 1027 (which can be firmware) for both occupancy detection and lighting control operations. The power distribution circuitry 1925 distributes power and ground voltages to the MCU 1030, wireless transmitter 1008 and wireless receiver 1010, to provide reliable operation of the various circuitry on the sensor type element 1015 chip.

The sensor type element 1015 also includes a wireless radio communication interface system configured for two way wireless communication on at least one band. Optionally, the wireless radio communication interface system may be a dual-band system. It should be understood that "dual-band" means communications over two separate RF bands. The communication over the two separate RF bands can occur simultaneously (concurrently); however, it should be understood that the communication over the two separate RF bands may not actually occur simultaneously.

In our example, the sensor type element 1015 has a radio transmitter 1008 as well as radio receiver 1010 together forming a radio transceiver. The wireless transmitter 1008 transmits RF signals on the lighting network. This wireless transmitter 1008 wireless communication of control and systems operations information, during luminaire operation and during transmission over the first wireless communication band. The wireless receiver carries out receiving of the RF signals from other system elements on the network and generating RSSI data based on signal strengths of the received RF signals. If provided (optional) another transceiver (Tx and Rx) may be provided, for example, for point-to-point communication, over a second different wireless communication bands, e.g. for communication of information other than the control and systems operations information, concurrently with at least some communications over the first wireless communication band. Optionally, the luminaire sensor type element 1015 may have a radio set forming a second transceiver (shown in dotted lines, transmitter and receiver not separately shown).

The included transceiver (solid lines), for example, may be a sub GHz transceiver or a Bluetooth transceiver configured to operate in a standard GHz band. A dual-band implementation might include two transceivers for different bands, e.g. for a sub GHz band and a GHz band for Bluetooth or the like. Additional transceivers may be provided. The particular bands/transceivers are described here by way of non-limiting example, only.

If two bands are supported, the two bands may be for different applications, e.g. lighting system operational communications and system element maintenance/commissioning. Alternatively, the two bands may support traffic segregation, e.g. one band may be allocated to communications of the entity owning/operating the system at the premises whereas the other band may be allocated to communications of a different entity such as the system manufacturer or a maintenance service bureau.

The MCU 1030 may be a system on a chip. Alternatively, a system on a chip may include the transmitter 1008 and the receiver 1010 as well as the circuitry of the MCU 830.

As shown, the sensor type element 1015 includes a drive/sense circuitry 1035, such as an application firmware, drives the occupancy, daylight, audio, and photo sensor hardware. The drive/sense circuitry 1035 detects state changes (such as change of occupancy, audio or daylight) via sensor detector(s) 1065, such as occupancy, audio, daylight, temperature or other environment related sensors. Sensors 1065 may be based on Acuity Brands Lighting's commercially available xPoint® Wireless ES7 product.

Also as shown, the MCU 1030 includes programming in the memory 1022. A portion of the programming configures the CPU (processor) 1023 to detect one of an occupancy or non-occupancy condition in an area in the lighting network, including the communications over one or more different wireless communication bands. The programming in the memory 1022 includes a real-time operating system (RTOS) and further includes a lighting application 1027 which is firmware/software that engages in communications with controlling of the light source based on one of the occupancy or non-occupancy condition detected by the CPU 1023. The lighting application 1027 programming in the memory 1022 carries out lighting control operations over the lighting system 702 of FIG. 7. The programming for the detection of an occupancy or non-occupancy condition in the area may be implemented as part of the RTOS, as part of the lighting application 1027, as a standalone application program, or as other instructions in the memory.

Figure 11:
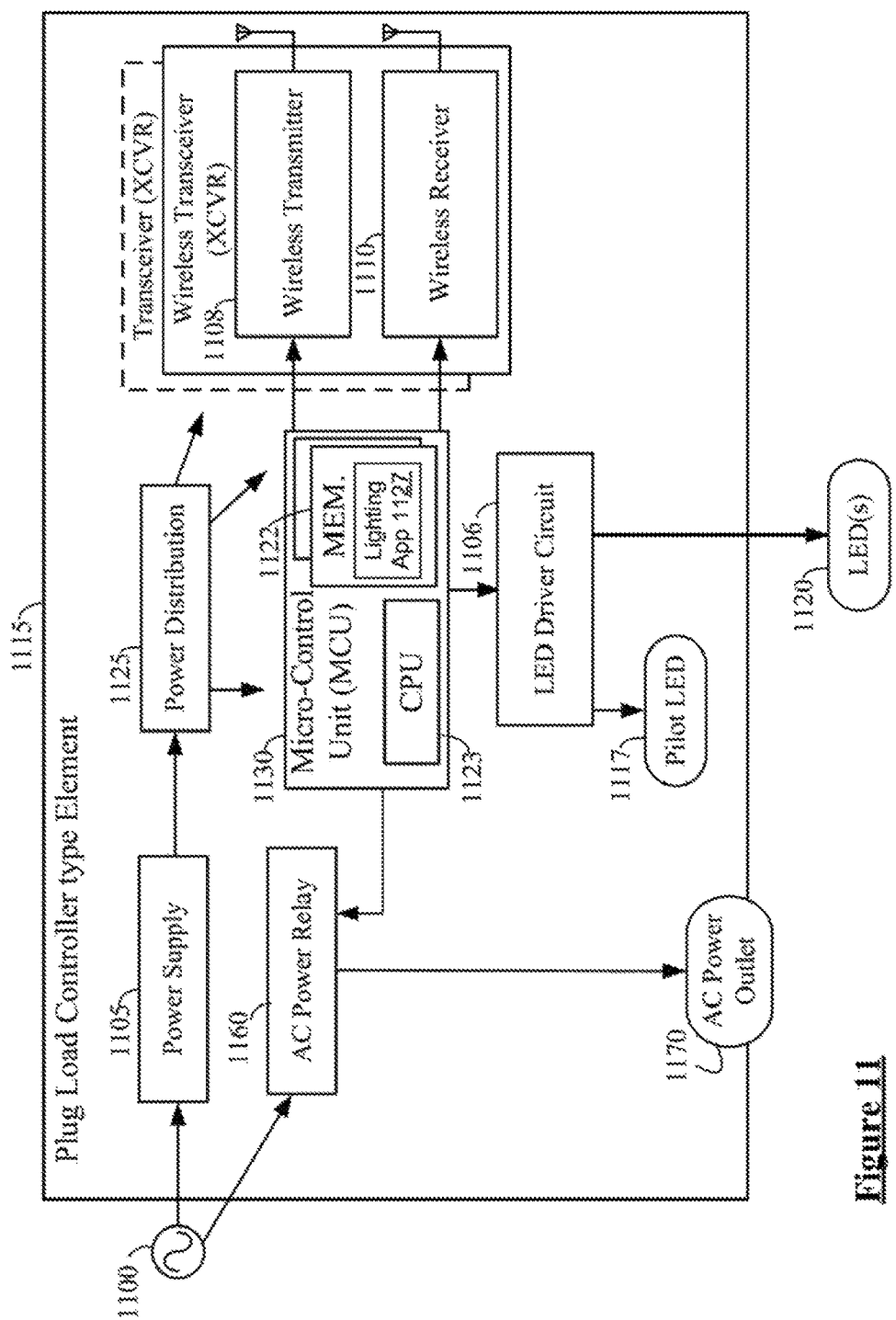
FIG. 11 is a block diagram of a plug load controller type element that operates in and communicates via the lighting system of FIG. 7.

FIG. 11 is a block diagram of a plug load controller type element (plug load element) 1115 that operates in and communicates via the lighting system 702 of FIG. 7. In one example, plug load element 1115 is an integrated switchable power connector that generally includes a power supply 1105 driven by a power source 1100. Power supply 1105 receives power from the power source 1100, such as an AC mains, battery, solar panel, or any other AC or DC source. Power supply 1105 may include a magnetic transformer, electronic transformer, switching converter, rectifier, or any other similar type of circuit to convert an input power signal into a power signal suitable for the plug load element 1115.

Plug load element 1115 includes an intelligent LED driver circuit 1106, coupled to LED (s) 1120 and drives that LED light source (LED) by regulating the power to LED 1120 by providing a constant quantity or power to LED 1120 as its electrical properties change with temperature, for example. The intelligent LED driver circuit 1106 includes a driver circuit that provides power to LED 1120 and a pilot LED 1117. Intelligent LED driver circuit 1106 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 1106 is manufactured by EldoLED.

LED driver circuit 1106 can further include an AC or DC current source or voltage source, a regulator, an amplifier (such as a linear amplifier or switching amplifier), a buck, boost, or buck/boost converter, or any other similar type of circuit or component. LED driver circuit 1106 outputs a variable voltage or current to the LED light source 1120 that may include a DC offset, such that its average value is nonzero, and/or an AC voltage.

The plug load element 1115 includes power distribution circuitry 1125 and a micro-control unit (MCU) 1130. As shown, MCU 1130 is coupled to LED driver circuit 1106 and controls the light source operation of the LED 1120. MCU 1130 includes a memory 1122 (volatile and non-volatile) and a central processing unit (CPU) 1123. The memory 1122 includes a lighting application 1127 (which can be firmware) for both occupancy detection and lighting control operations. The power distribution circuitry 1125 distributes power and ground voltages to the MCU 1130, wireless transmitter 1108 and wireless receiver 1106, to provide reliable operation of the various circuitry on the plug load control 1115 chip.

The plug load element 1115 also includes a wireless radio communication interface system configured for two way wireless communication on at least one band. Optionally, the wireless radio communication interface system may be a dual-band system. It should be understood that "dual-band" means communications over two separate RF bands. The communication over the two separate RF bands can occur simultaneously (concurrently); however, it should be understood that the communication over the two separate RF bands may not actually occur simultaneously.

In our example, the plug load element 1115 has a radio set that includes radio transmitter 1108 as well as a radio receiver 1110 forming a radio transceiver. The wireless transmitter 1108 transmits RF signals on the lighting network. This wireless transmitter 1108 wireless communication of control and systems operations information, during luminaire operation and during transmission over the first wireless communication band. The wireless receiver carries out receiving of the RF signals from other system elements on the network and generating RSSI data based on signal strengths of the received RF signals. If provided (optional) another transceiver (Tx and Rx) may be provided, for example, for point-to-point communication, over a second different wireless communication bands, e.g. for communication of information other than the control and systems operations information, concurrently with at least some communications over the first wireless communication band. Optionally, the plug load element 1115 may have a radio set forming a second transceiver (shown in dotted lines, transmitter and receiver not separately shown).

The included transceiver (solid lines), for example, may be a sub GHz transceiver or a Bluetooth transceiver configured to operate in a standard GHz band. A dual-band implementation might include two transceivers for different bands, e.g. for a sub GHz band and a GHz band for Bluetooth or the like. Additional transceivers may be provided. The particular bands/transceivers are described here by way of non-limiting example, only.

If two bands are supported, the two bands may be for different applications, e.g. lighting system operational communications and system element maintenance/commissioning. Alternatively, the two bands may support traffic segregation, e.g. one band may be allocated to communications of the entity owning/operating the system at the premises whereas the other band may be allocated to communications of a different entity such as the system manufacturer or a maintenance service bureau.

The MCU 1130 may be a system on a chip. Alternatively, a system on a chip may include the transmitter 1108 and the receiver 1110 as well as the circuitry of the MCU 1130.

Plug load element 1115 plugs into existing AC wall outlets, for example, and allows existing wired lighting devices, such as table lamps or floor lamps that plug into a wall outlet, to operate in the lighting system. The plug load element 1115 instantiates the table lamp or floor lamp by allowing for commissioning and maintenance operations and processes wireless lighting controls in order to the allow the lighting device to operate in the lighting system. Plug load element 1115 further comprises an AC power relay 1160 which relays incoming AC power from power source 1100 to other devices that may plug into the receptacle of plug load element 1115 thus providing an AC power outlet 1170.

Also, as shown, the MCU 1130 includes programming in the memory 1122. A portion of the programming configures the CPU (processor) 1123 to detect one of an occupancy or non-occupancy condition in an area in the lighting network, including the communications over one or more wireless communication bands. The programming in the memory 1122 includes a real-time operating system (RTOS) and further includes a lighting application 1127 which is firmware/software that engages in communications with controlling of the light source based on one of the occupancy or non-occupancy condition detected by the CPU 1123. As shown, a drive/sense circuitry detects a state change event. The lighting application 1127 programming in the memory 1122 carries out lighting control operations over the lighting system 702 of FIG. 7. The programming for the detection of an occupancy or non-occupancy condition in the area may be implemented as part of the RTOS, as part of the lighting application 1127, as a standalone application program, or as other instructions in the memory.

Aspects of methods of detecting occupancy and non-occupancy condition in a lighting system as described above may be embodied in programming, e.g. in the form of software, firmware, or microcode executable by a processor of any one or more of the lighting system nodes, or by a processor of a portable handheld device, a user computer system, a server computer or other programmable device in communication with one or more nodes of the lighting system. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into platform such as one of the controllers of FIGS. 2-10. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine readable medium may take many forms, including but not limited to, a tangible or non-transitory storage medium, a carrier wave medium or physical transmission medium. Non-volatile storage media include, for example, optical or magnetic disks, such as any of the storage hardware in any computer(s), portable user devices or the like, such as may be used. Volatile storage media include dynamic memory, such as main memory of such a computer or other hardware platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge (the preceding computer-readable media being "non-transitory" and "tangible" storage media), a carrier wave transporting data or instructions, cables or links transporting such a carrier wave, or any other medium from which a computer can read programming code and/or data. Many of these forms of computer readable media may be involved in carrying data and/or one or more sequences of one or more instructions to a processor for execution.

Program instructions may comprise a software or firmware implementation encoded in any desired language. Programming instructions, when embodied in a machine readable medium accessible to a processor of a computer system or device, render a computer system or a device into a special-purpose machine that is customized to perform the operations specified in the program instructions.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. For example, unless expressly stated otherwise, a parameter value or the like may vary by as much as ±10% from the stated amount.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes", "including" or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A lighting system comprising:
a wireless communication transmitter for wireless radio communication in an area via a wireless radio communication network, the communication including a transmission of a radio frequency (RF) signal;
a wireless communication receiver configured to receive the transmission of the RF signal through the area and generate an indicator data of a signal characteristic of the RF signal;
a detector configured to:
obtain the indicator data of the RF signal from the wireless communication receiver,
compare the indicator data with a baseline indicator data to generate a difference value;
determine, from the indicator data, a rate of change;
determine a data metric based on the rate of change and the difference value; and
compare the data metric with a transition threshold to detect one of an occupancy condition or a non-occupancy condition in the area; and
a light source controlled in response to the detected one of the occupancy condition or the non-occupancy condition in the area.

2. The lighting system of claim 1, comprising:
a system node including the wireless communication receiver and the detector,
wherein the system node: includes one or more of the light source and is configured as a lighting device, a user interface component and is configured as a lighting controller, a switchable power connector and is configured as a plug load controller, or a sensor detector and is configured as a lighting related sensor.

3. The lighting system of claim 2, comprising another system node including the wireless communication transmitter,
wherein the another system node includes one or more of the light source and is configured as the lighting device, the user interface component and is configured as the lighting controller, the switchable power connector and is configured as the plug load controller or the sensor detector and is configured as the lighting related sensor.

4. The lighting system of claim 3, wherein the system node and the another system node are coupled for communication via a network.

5. The lighting system of claim 1, comprising:
a system node including the wireless communication transmitter,
wherein the system node: includes one or more of the light source and is configured as a lighting device, a user interface component and is configured as a lighting controller, a switchable power connector is being configured as a plug load controller or a sensor detector and is configured as a lighting related sensor.

6. The lighting system of claim 5, further comprising:
another system node,
wherein the other system node: includes one or more of the light source and is configured as the lighting device, the user interface component and is configured as the lighting controller, the switchable power connector and being configured as the plug load controller or the sensor detector and is configured as the lighting related sensor.

7. The lighting system of claim 1, wherein the indicator data is one of a relative signal strength indicator (RSSI) data, bit error rate data, packet error rate data, or a phase change data, or a combination of two or more thereof.

8. The lighting system of claim 1, wherein the indicator data is generated at a plurality of times, and when each time among the plurality of times is a current time, the detector is further configured to:
compare each of the indicator data generated at the current time among the plurality of times with the baseline indicator data at an earlier time to generate the difference value, wherein the earlier time is different from the plurality of times; and
compare each of the indicator data generated at the current time with the indicator data generated at a preceding time among the plurality of times before the current time to generate the rate of change.

9. The lighting system of claim 8, wherein the earlier time is a baseline time interval and the preceding time is a preceding time interval such that the baseline time interval is longer than the preceding time interval and the baseline indicator data is calculated as an average indicator data over the baseline time interval.

10. The lighting system of claim 8, wherein the detector is further configured to:

compute a variance metric based on the difference value and the rate of change; and compute a sum of variance metric based on the variance metric, wherein the sum of variance metric is one of a sum of the variance metric at the current time with the variance metric at an immediate preceding time multiplied by a decay factor or a rolling sum of the variance metrics within a set window of time.

11. The lighting system of claim 10, wherein the transition threshold is one of a rising transition threshold or a falling transition threshold.

12. The lighting system of claim 11, wherein:
the detector is further configured to:
detect the occupancy condition in the area upon determination that the sum of variance metric is greater than the rising transition threshold, wherein the rising transition threshold is a minimum value of the sum of variance metric to detect the occupancy condition in the area; and
detect the non-occupancy condition in the area upon determination that the sum of the variance metric is less than the falling transition threshold, wherein the falling transition threshold is a maximum value of the sum of variance metric to detect the non-occupancy condition in the area.

13. The lighting system of claim 12, wherein:
when the sum of variance metric is between the rising transition threshold and the falling transition threshold, the detector is further configured to:
detect the occupancy condition in the area when the occupied condition existed at a previous time among the plurality of times, and the previous time occurs before the current time; and
detect the non-occupancy condition in the area when the non-occupied condition existed at the previous time.

14. The lighting system of claim 13, wherein the detector is further configured to:
generate an occupancy detection signal upon determination of the occupancy condition in the area; and
generate a non-occupancy detection signal upon determination of the non-occupancy condition in the area.

15. The lighting system claim 1, further comprising a controller, wherein the controller is coupled to the detector and is configured to control an operation of the light source in the area upon receipt of one of the occupancy detection signal or the non-occupancy detection signal.

16. A lighting system comprising:
a plurality of system nodes,
each of a plurality of the system nodes including a light source and being configured as a lighting device, and
at least one other of the system nodes: including one of a user interface component and being configured as a lighting controller, a switchable power connector and being configured as a plug load controller or a sensor detector and being configured as a lighting related sensor;
wherein each respective system node further comprises:
a wireless communication interface including a wireless communication transmitter and a wireless communication receiver configured to enable wireless data communication among the system nodes;
a processor coupled to one of the light source, the user interface component, the switchable power connector or the photo detector and coupled to communicate via the communication interface and a wireless network link;
a memory accessible to the processor; and
programming in the memory which configures the processor to control operations of the respective system node as one of the lighting device, the lighting controller, the plug load controller or the lighting related sensor,
wherein:
programming in at least one of the system nodes configures the at least one of the system nodes to transmit a radio frequency (RF) signal;
programming in at least one of the system nodes configures the at least one of the system nodes to receive the transmission of the RF signal through an area illuminated by the lighting device and generate indicator data of a signal characteristic of the RF signal; and
programming in at least one of the system nodes configures the at least one of the system nodes to:
obtain the indicator data of the RF signal;
compare the indicator data with a baseline indicator data to generate a difference value;
determine, from the indicator data, a rate of change;
determine a data metric based on the rate of change and the difference value; and
compare the data metric with a transition threshold to detect one of an occupancy condition or a non-occupancy condition in the area, wherein the light source is controlled in response to the detect one of the occupancy condition or the non-occupancy condition.

17. The lighting system of claim 16, wherein the indicator data is one of a relative signal strength indicator (RSSI) data, bit error rate data, packet error rate data or a phase change data or a combination of two or more thereof.

18. The lighting system of claim 16, wherein the indicator data is generated at a plurality of times, wherein each of the indicator data generated at a current time among the plurality of times is compared with the baseline indicator data at an earlier time to generate the difference value, wherein the earlier time is different from the plurality of times and each of the indicator data generated at the current time is compared with the indicator data generated at a preceding time among the plurality of times before the current time to generate the rate of change.

19. The lighting system of claim 18, wherein the earlier time is a baseline time interval and the preceding time is a preceding time interval such that the baseline time interval is longer than the preceding time interval and the baseline indicator data is calculated as an average indicator data calculated over the baseline time interval.

20. The lighting system of claim 18, wherein a variance metric is computed based on the difference value and the rate of change and a sum of variance metric is computed based on the variance metric, wherein the sum of variance metric is one of a sum of the variance metric at the current time with the variance metric at an immediate preceding time multiplied by a decay factor or a rolling sum of the variance metrics within a set window of time.

21. The lighting system of claim 20, wherein the transition threshold is one of a rising transition threshold or a falling transition threshold.

22. The lighting system of claim 21, wherein:
the programming in at least one of the system nodes configures the at least one of the system nodes to:
detect the occupancy condition in the area upon determination that the sum of variance metric is greater than the rising transition threshold, wherein the rising transition threshold is a is a minimum value of the sum of variance metric to detect the occupancy condition in the area and detect the non-occupancy condition in the area upon determination that the sum of the variance metric is less than the falling transition threshold, wherein the falling transition threshold is a maximum value of the sum of variance metric to detect the non-occupancy condition in the area.

23. The lighting system of claim 22, wherein:

when the sum of variance metric is between the rising transition threshold and the falling transition threshold, the programming in at least one of the system nodes configures the at least one of the system nodes further configures to:

detect the occupancy condition in the area when the occupied condition existed at a previous time among the plurality of times, and the previous time occurs before the current time; and detect the non-occupancy condition in the area when the non-occupied condition existed at the previous time.

24. A method comprising:

obtaining, in a lighting system, indicator data of a radio frequency (RF) signal received via a wireless communication receiver;

comparing, in the lighting system, the indicator data with a baseline indicator data corresponding to a non-occupancy condition to generate a difference value;

determining, in the lighting system, from the indicator data, a rate of change;

determining, in the lighting system, a data metric based on the rate of change and the difference value;

comparing, in the lighting system, the data metric with a transition threshold to detect one of an occupancy condition or a non-occupancy condition in an area illuminated by a light source; and controlling the light source of the lighting system in response to the detected one of the occupancy or the non-occupancy condition in the area.

25. The method of claim 24, wherein the indicator data is one of a relative signal strength indicator (RSSI) data, bit error rate data, packet error rate data, or a phase change data, or a combination of two or more thereof.

26. The method of claim 24, wherein the indicator data is generated at a plurality of times such that the method further comprising:

comparing the indicator data generated at a current time among the plurality of times with the baseline indicator data at an earlier time to generate the difference value, wherein the earlier time is different from the plurality of times; and comparing the indicator data generated at the current time with the indicator data generated at a preceding time among the plurality of times before the current time to generate the rate of change.

27. The method of claim 26, further comprising:

computing a variance metric based on the difference value and the rate of change; and computing a sum of variance metric based on the variance metric, wherein the sum of variance metric is one of a sum of the variance metric at the current time with the variance metric at an immediate preceding time multiplied by a decay factor or a rolling sum of the variance metrics within a set window of time.

28. The method of claim 27, wherein the transition threshold is one of a rising transition threshold or a falling transition threshold.

29. The method of claim 28, further comprising:

detecting the occupancy condition in the area upon determination that the sum of variance metric is greater than the rising transition threshold, wherein the rising transition threshold is a minimum value of the sum of variance metric to detect the occupancy condition in the area; and detecting the non-occupancy condition in the area upon determination that the sum of the variance metric is less than the falling transition threshold, wherein the falling transition threshold is a maximum value of the sum of variance metric to detect the non-occupancy condition in the area.

30. The method of claim 29, further comprising:

when the sum of variance metric is between the rising transition threshold and the falling transition threshold:

detecting the occupancy condition in the area when the occupied condition existed at a previous time among the plurality of times, and the previous time occurs before the current time; and detecting the non-occupancy condition in the area when the non-occupied condition existed at a previous time among the plurality of times, and the previous time occurs before the current time.

31. A system comprising:

a lighting system comprising:

a first system node comprising a wireless communication transmitter for wireless radio communication in the area via a wireless radio communication network in real time, the communication including a transmission of a radio frequency (RF) signal; and a second system node coupled to the first node via a network, wherein the second system node comprises:

a wireless communication receiver configured to receive the transmission of the RF signal through the area and generate an indicator data of a signal characteristic of the RF signal;

a detector configured to:

obtain the indicator data of the RF signal generated from the wireless communication receiver, compare the indicator data with a baseline indicator data to generate a difference value;

determine, from the indicator data, a rate of change;

determine a data metric based on the rate of change and the difference value; and compare the data metric with a transition threshold to detect one of an occupancy condition or a non-occupancy condition in the area; and a controller coupled to the lighting system via a communications network, and the controller is configured to control operation of a light source in the lighting system in response to the detected one of the occupancy condition or the non-occupancy condition.

32. The system of claim 31, wherein the indicator data is one of a relative signal strength indicator (RSSI) data, bit error rate data, packet error rate data or a phase change data or a combination of two or more thereof.

33. The system of claim 31, wherein the indicator data is generated at a plurality of times and when each time among the plurality of times is a current time, the detector is further configured to:

compare each of the indicator data generated at the current time with the baseline indicator data at an earlier time to generate the difference value, wherein the earlier time is different from the plurality of times; and compare each of the indicator data generated at the current time with the indicator data generated at a preceding time among the plurality of times before the current time to generate the rate of change.

34. The system of claim 33, wherein the earlier time is a baseline time interval and the preceding time is a preceding time interval such that the baseline time interval is longer than the preceding time interval and the baseline indicator data is calculated as an average indicator data calculated over the baseline time interval.

35. The system of claim 32, wherein the detector to:
compute a variance metric based on the difference value and the rate of change; and
compute a sum of variance metric based on the variance metric, wherein the sum of variance metric is one of a sum of the variance metric at the current time with the variance metric at an immediate preceding time multiplied by a decay factor or a rolling sum of the variance metrics within a set window of time.

36. The system of claim 35, wherein the transition threshold is one of a rising transition threshold or a falling transition threshold.

37. The system of claim 36, wherein the detector to:
detect the occupancy condition in the area upon determination that the sum of variance metric is greater than the rising transition threshold, wherein the rising transition threshold is a minimum value of the sum of variance metric to detect the occupancy condition in the area; and
detect the non-occupancy condition in the area upon determination that the sum of the variance metric is less than the falling transition threshold, wherein the falling transition threshold is maximum value of the sum of variance metric to detect the non-occupancy condition in the area.

38. The system of claim 37, wherein when the sum of variance metric is between the rising transition threshold and the falling transition threshold, the detector is further configured to:
detect the occupancy condition in the area when the occupied condition existed at a previous time among the plurality of times, and the previous time occurs before the current time; and
detect the non-occupancy condition in the area when the non-occupied condition existed at the previous time.

39. A system comprising:
a wireless communication transmitter for wireless radio communication including a transmission of a radio frequency (RF) signal in the area via a wireless radio communication network; and
a lighting system comprising:
a wireless communication receiver configured to receive the transmission of the RF signal through the area and generate an indicator data of a signal characteristic of the RF signal;
a detector configured to:
obtain the indicator data of the RF signal from the wireless communication receiver,
compare the indicator data with a baseline indicator data to generate a difference value;
determine, from the indication data, a rate of change;
determine a data metric based on the rate of change and the difference value; and
compare the data metric with a transition threshold to detect one of an occupancy condition or a non-occupancy condition in the area; and a controller configured to control operation of a light source in the lighting system in response to the detected one of the occupancy condition or the non-occupancy condition.

40. The system of claim 39, wherein the indicator data is one of a relative signal strength indicator (RSSI) data, bit error rate data, packet error rate data or a phase change data or a combination of two or more thereof.

41. The system of claim 39, wherein the indicator data is generated at a plurality of times, and when each time among the plurality of times is a current time, the detector is configured to:
compare each of the indicator data generated at the current with the baseline indicator data at an earlier time to generate the difference value, wherein the earlier time is different from the plurality of times; and
compare each of the indicator data generated at the current time with the indicator data generated at a preceding time before the current time to generate the rate of change.

42. The system of claim 41, wherein the, the earlier time is a baseline time interval and the preceding time is a preceding time interval such that the baseline time interval is longer than the preceding time interval and the baseline indicator data is calculated as an average indicator data calculated over the baseline time interval.

43. The system of claim 42, wherein the detector is further configured to:
compute a variance metric based on the difference value and the rate of change; and
compute a sum of variance metric based on the variance metric, wherein the sum of variance metric is one of a sum of the variance metric at the current time with the variance metric at an immediate preceding time multiplied by a decay factor or a rolling sum of the variance metrics within a set window of time.

44. The system of claim 43, wherein the transition threshold is one of a rising transition threshold or a falling transition threshold.

45. The system of claim 44, wherein:
the detector is further configured to:
detect the occupancy condition in the area upon determination that the sum of variance metric is greater than the rising transition threshold, wherein the rising transition threshold is a minimum value of the sum of variance metric to detect the occupancy condition in the area; and
detect the non-occupancy condition in the area upon determination that the sum of the variance metric is less than the falling transition threshold, wherein the falling transition threshold is a maximum value of the sum of variance metric to detect the non-occupancy condition in the area.

46. The system of claim 45, wherein:
when the sum of variance metric is between the rising transition threshold and the falling transition threshold, the detector is further configured to:
detect the occupancy condition in the area when the occupied condition existed at a previous time among the plurality of times, and the previous time occurs before the current time; and
detect the non-occupancy condition in the area when the non-occupied condition existed at the previous time.

* * * * *